(12) United States Patent
Longenecker et al.

(10) Patent No.: US 12,263,764 B2
(45) Date of Patent: Apr. 1, 2025

(54) ROTATABLE CAR SEAT WITH DETACHABLE SEAT AND TOP ANCHOR

(71) Applicant: ARTSANA USA, INC., Lancaster, PA (US)

(72) Inventors: Michael L. Longenecker, Lancaster, PA (US); Derek A. Eberly, New Holland, PA (US)

(73) Assignee: Artsana USA, Inc., Lancaster, PA (US)

( * ) Notice: Subject to any disclaimer, the term of this patent is extended or adjusted under 35 U.S.C. 154(b) by 260 days.

(21) Appl. No.: 17/874,551

(22) Filed: Jul. 27, 2022

(65) Prior Publication Data

US 2022/0355713 A1 Nov. 10, 2022

Related U.S. Application Data

(63) Continuation-in-part of application No. 17/169,128, filed on Feb. 5, 2021, now Pat. No. 11,584,267.

(60) Provisional application No. 62/970,318, filed on Feb. 5, 2020.

(51) Int. Cl.
*B60N 2/28* (2006.01)
*B60R 1/00* (2022.01)

(52) U.S. Cl.
CPC ......... *B60N 2/2869* (2013.01); *B60N 2/2821* (2013.01); *B60R 1/008* (2013.01); *B60N 2/2809* (2013.01)

(58) Field of Classification Search
CPC ...... B60N 2/28; B60N 2/2821; B60N 2/2869; B60R 1/008; A47D 15/00

USPC .......................................................... 297/185
See application file for complete search history.

(56) References Cited

U.S. PATENT DOCUMENTS

| | | | |
|---|---|---|---|
| 4,762,364 A | 8/1988 | Young | |
| 4,971,392 A | 11/1990 | Young | |
| 6,039,455 A * | 3/2000 | Sorenson | ................ B60R 1/008 362/135 |
| 6,196,629 B1 | 3/2001 | Onishi et al. | |
| 6,241,314 B1 | 6/2001 | Pufall | |
| 6,367,875 B1 * | 4/2002 | Bapst | ................... B60N 2/2821 297/130 |

(Continued)

FOREIGN PATENT DOCUMENTS

| | | |
|---|---|---|
| EP | 1344678 A2 | 9/2003 |
| EP | 1625968 A1 | 2/2006 |

(Continued)

*Primary Examiner* — David R Dunn
*Assistant Examiner* — Tania Abraham
(74) *Attorney, Agent, or Firm* — Saxton & Stump, LLC

(57) ABSTRACT

An accessory mount for use with a child safety seat having a base including a rotating mechanism for detachably connecting a seat shell for a child. The base enables rotation of the seat shell into forward-facing, rearward-facing, or side-facing configurations. The base also includes an upstanding backrest portion and is anchorable in the vehicle. The backrest portion includes a reinforcement structure disposed in an upper end that is engageable to a portion of the seat shell when the seat is forward-facing to reinforce the seat shell anchorage. The accessory mount includes an attachment base adapted to matingly engage a portion of the upstanding backrest portion when the seat shell is rearward-facing to allow, for example, a mirror to be attached providing a view of the infant occupant to a vehicle driver.

16 Claims, 32 Drawing Sheets

(56) References Cited

U.S. PATENT DOCUMENTS

| | | |
|---|---|---|
| 6,431,647 B2 | 8/2002 | Yamazaki |
| 6,491,403 B2 * | 12/2002 | Edgar .................. B60R 1/008 359/872 |
| 6,508,510 B2 | 1/2003 | Yamazaki |
| 6,773,123 B1 * | 8/2004 | Hatchett ............. B60N 2/2821 359/872 |
| 6,779,900 B1 | 8/2004 | Nolan-Brown |
| 6,938,954 B1 | 9/2005 | Hendren et al. |
| 7,073,859 B1 | 7/2006 | Wilson |
| 7,097,314 B1 * | 8/2006 | Darling ................. B60R 1/008 359/872 |
| 7,232,185 B2 | 6/2007 | Hartenstine et al. |
| 7,338,122 B2 | 3/2008 | Hei et al. |
| 7,357,451 B2 | 4/2008 | Bendure et al. |
| 7,478,877 B2 | 1/2009 | Homme et al. |
| 7,490,897 B2 | 2/2009 | Lhomme et al. |
| 7,712,830 B2 | 5/2010 | Lhomme et al. |
| 7,753,444 B2 | 7/2010 | Vallentin |
| 7,887,129 B2 | 2/2011 | Hei et al. |
| 7,988,230 B2 | 8/2011 | Heisey et al. |
| 8,955,915 B2 | 2/2015 | Mason et al. |
| 9,016,782 B2 | 4/2015 | Xu |
| 9,090,182 B2 | 7/2015 | Rabeony |
| 9,114,739 B2 | 8/2015 | Conway |
| 9,346,377 B2 | 5/2016 | Xu |
| 9,365,135 B2 | 6/2016 | Carpenter |
| 9,415,707 B2 | 8/2016 | Böhm |
| 9,434,279 B2 | 9/2016 | Williams |
| 9,499,074 B2 | 11/2016 | Strong et al. |
| 10,189,381 B2 | 1/2019 | Williams et al. |
| 10,322,651 B2 | 6/2019 | Hutchinson et al. |
| 10,336,219 B2 | 7/2019 | Mason et al. |
| 10,449,876 B2 | 10/2019 | Lonstein et al. |
| 10,457,168 B2 | 10/2019 | Anderson et al. |
| 2001/0004162 A1 | 6/2001 | Yamazaki |
| 2004/0070246 A1 | 4/2004 | Adachi |
| 2008/0224516 A1 | 9/2008 | Vegt |
| 2014/0042782 A1 * | 2/2014 | Lapointe .................. B60N 2/28 297/184.13 |
| 2015/0336481 A1 | 11/2015 | Horsfall |
| 2017/0355287 A1 | 12/2017 | Anderson |
| 2018/0264977 A1 | 9/2018 | Anderson et al. |
| 2019/0077282 A1 | 3/2019 | Reaves et al. |

FOREIGN PATENT DOCUMENTS

| | | | |
|---|---|---|---|
| GB | 2297479 A | | 8/1996 |
| GB | 2425463 B | | 11/2006 |
| GB | 2553825 A | * 3/2018 | ............... B60R 1/00 |
| KR | 20090044672 A | | 5/2009 |
| WO | 2015027275 A1 | | 3/2015 |
| WO | 2019053102 A1 | | 3/2019 |
| WO | 2020015599 A1 | | 1/2020 |

* cited by examiner

ROTATABLE CAR SEAT WITH DETACHABLE SEAT AND TOP ANCHOR

CROSS REFERENCE TO RELATED APPLICATIONS

This application is a continuation in part application of U.S. patent application Ser. No. 17/169,128, filed Feb. 5, 2021.

BACKGROUND OF THE INVENTION

The present invention relates to child restraints adapted to be anchored to a vehicle seat to transport a child in the vehicle, and more particularly, the to a child restraining seat including a swiveling seat portion, that is easily installable into a vehicle.

Safety seats in vehicles for children (car seats) are well-known in the art. Car seats are removable units that are secured to a selected passenger seat of a vehicle. Car seats are specially designed for the smaller weight and size of a child, as compared to standard vehicle seats, which are designed to accommodate large youths and adults. Most states have statutes requiring that children below certain age and/or weight limits be positioned in a rear-facing seat. Once the child reaches a certain weight and age a front-facing car seat may be used.

Prior-art car seats are designed to secure a child and limit movement of the child which can make it difficult to move the child into or from such the seat. Car seats typically includes partially raised sides and a five-point seatbelt harness to secure the child to the car seat. The raised sides of a forward-facing seat, however, make it necessary for an adult that is assisting the child into the seat to lift the child over a side of the seat and then place the child in the seat. Due to the confined space in most passenger vehicles, the adult must remain outside the vehicle when lifting the child and installing the five-point harness, causing the adult to bend and lean or reach into the vehicle. The same demands on the adult are required to remove the child from the car seat.

Car seats used in front-facing orientations are required to be reinforced to withstand additional forces larger occupants place on the restraint harness during vehicle crashes. Some car seats are secured by attachments points near the seat base secured to LATCH anchors in the vehicle seat and a tether connected higher on the car seat back attached to a tether anchor, typically positioned near the top of the vehicle seat back. Other car seats may eschew the tether and require additional structural reinforcement between the base and back to withstand crash loads imparted to the seat back through the child shoulder restraints.

A need exists for a car seat that allows a child to be placed into and removed from a car seat without the need for an assisting adult to substantially lean inside the vehicle, or to lift the child over a raised side of the car seat. A swiveling car seat provides such an apparatus, selectively swiveling between a forward-facing position and a side or door-facing position to enable a child to enter and/or exit the seat. Benefits are provided by a swiveling car seat that may be swiveled between a forward-facing orientation, a side-facing orientation, and a rear-facing orientation. Additional advantages would be realized by a swiveling car seat that may be positioned to a side-facing orientation in either direction to allow seat installation on either side of a vehicle. Still further advantages would be realized by a swiveling car seat in which the seat shell is removeable.

To provide a swiveling car seat capable of forward-facing use and able to withstand crash loads from larger occupants, the swiveling car seat should incorporate a means to reinforce the swiveling portion and allow the seat back to be anchored to an upper tether mount of a three-point occupant restraint in the vehicle so that the functional features may be provided in a design that meets applicable safety standards.

SUMMARY OF THE INVENTION

Accordingly, the present invention, in any of the embodiments described herein, may provide one or more of the following advantages:

It is an object of the present invention to provide a child safety seat for use in a vehicle, the safety seat having a base including a rotating mechanism and a seat shell for a child that is detachably connectable to the base. The base is anchorable in the vehicle using either conventional safety belts or LATCH anchoring provisions. The seat shell, when connected to the base, may be rotated about a generally upstanding axis into forward-facing, rearward-facing, or side-facing configurations.

It is a further object of the present invention to provide a child safety seat for use in a vehicle, the seat having a seat shell that is rotatable relative to the base, the base being secured to the vehicle using both lap portion and shoulder portion of the vehicle safety belts to retain the base to the vehicle and a connection between the seat shell and the base disposed adjacent to the upper backrest portion of the seat shell, the combination enabling the seat to be used with a wider size range of children. The seat shell includes a backrest portion extending upwardly from a seating portion, the backrest portion including a retention member engageable with the base at a position adjacent to the upper backrest portion of the shell, the base connection with the shoulder portion of the vehicle safety belt reinforcing the connection with the vehicle when the seat shell is in the forward-facing configuration. The engagement of the backrest portion of the seat shell with the shoulder belt reinforces the structure to which the child is secured and increases the rated weight limits for children to be restrained by the safety seat.

It is a further object of the present invention to provide a child safety seat for use in a vehicle having a based that is removably securable in a vehicle and a seat shell removably connectable to the base. The seat shell may be swiveled about a generally upstanding axis and locked into forward-facing or rearward-facing positions. The seat shell may also be swiveled to side-facing positions to improve access to the child when placing or removing the child from the safety seat. The seat shell may be easily detached from the base. A release mechanism easily operable by a user allows, when operated, the shell to be lifted from the base.

It is a still further object of the present invention to provide a child safety seat that is configurable to suit children of wide-ranging sizes. The swiveling seat shell permits the safety seat to be configured for rearward-facing use as is preferred for infants and forward-facing for larger children. The seat shell is also provided with an adjustable backrest with a convenient headrest height-adjusting mechanism. The height adjustment mechanism includes a moveable roll for the child shoulder harness to manage adjustment of the shoulder harness as the head rest is adjusted between varying heights.

It is a still further object of the present invention to provide a child safety seat having a base that may be secured in a vehicle using a three-point safety belt or LATCH connectors normally available in the vehicle and a seat portion removably attached to the base, the seat portion capable of swiveling in relation to a base allowing forward-facing, rearward-facing, and side facing configurations for use in a vehicle that is durable in construction, inexpensive of manufacture, carefree of maintenance, easily assembled, and simple and effective to use.

These and other objects are achieved in accordance with the present invention by providing a child safety seat for use in a vehicle, the safety seat having a base including a rotating mechanism and a seat shell for a child that is detachably connectable to the base. The base is anchorable in the vehicle using either conventional safety belts or LATCH anchoring provisions. The base is configured to allow a conventional three-point occupant restraint to secure the base to the vehicle and to prevent interaction between the seat shell and the restraint belt. The seat shell, when connected to the base, may be rotated about a generally upstanding axis into forward-facing, rearward-facing, or side-facing configurations. The base includes a moveable wedge that allows the base to optimally fit a variety of vehicle seat having different seat cushion inclinations. The seat shell also includes a height-adjustable backrest portion that allows the seat configuration to be optimized for the occupant, even as the occupant child grows.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Figure 1:
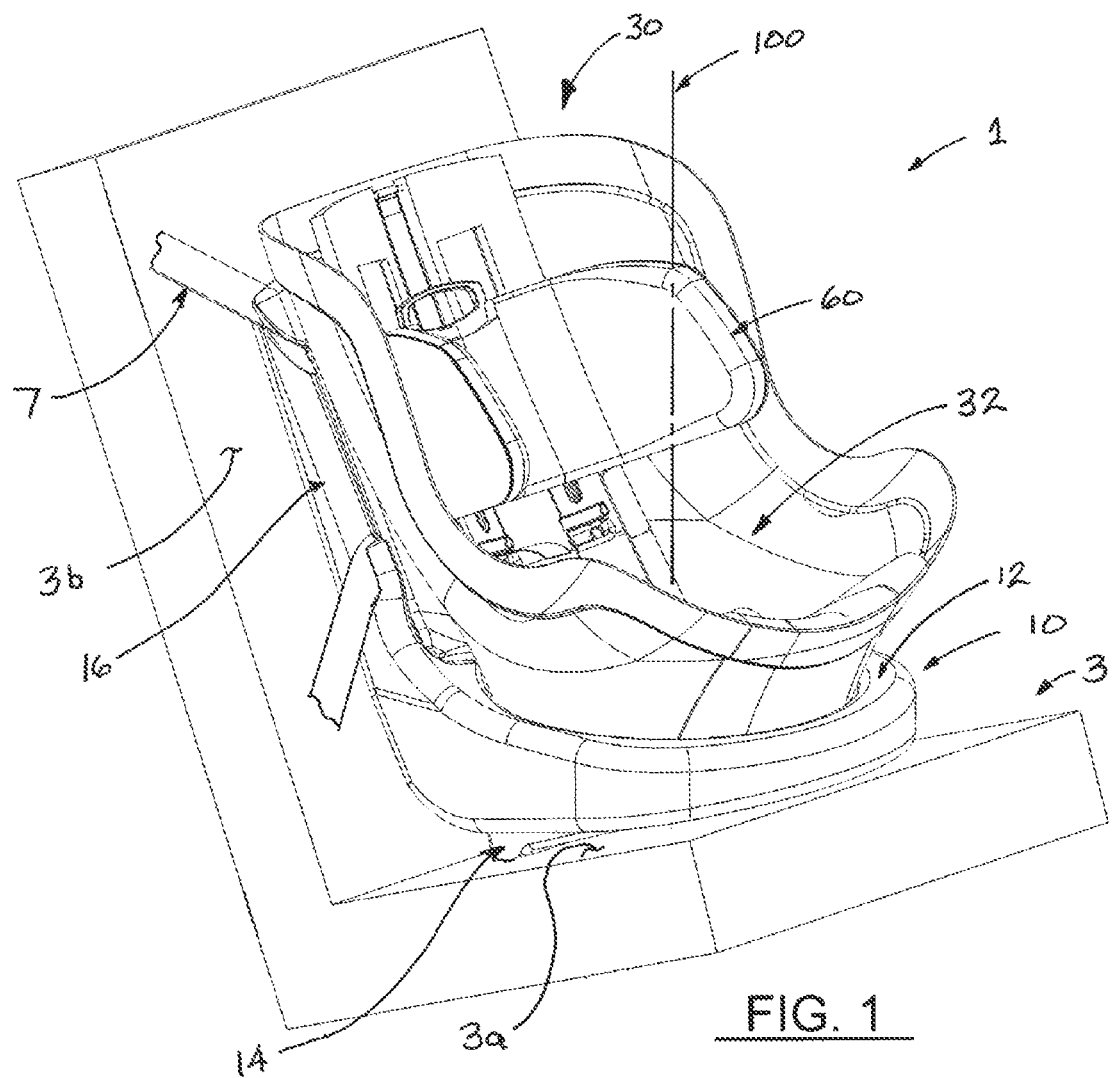
FIG. 1 is a perspective view of one embodiment of the present child safety seat invention as it would be installed in a vehicle wherein the child seat orients the occupant in a forward-facing position.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience and are determined as the seat would normally be positioned on a surface or vehicle seat. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all figures.

Referring to the figures, a child safety seat 1 embodying the present inventions comprises a base assembly 10 configured to be positioned and secured on the seating surface 3a of a vehicle seat 3 using the seat belt 7 installed in the vehicle. Alternatively, the base assembly 10 may be secured to the vehicle seat using Lower Anchors and Tethers for Children (LATCH) provisions that may be present in the vehicle. The base assembly 10 includes a base portion 12 for positioning in the vehicle to support the seat shell 30 of the child safety seat. A backrest portion 16 extends upwardly from the base portion 12 and, when installed in a vehicle seat 3, is in adjacent contact with the backrest surface 3b of the vehicle seat. The base portion 12 further includes a wedge adjuster 14 which allows the base assembly 10 to be configured to securely fit into a variety of vehicle seats of different inclinations of the seating surface 3a to assure simultaneous adjacent contact by the base assembly 10 with both the seating surface 3a and the backrest surface 3b.

The base assembly 10 may be secured to the vehicle seat 3 using the safety belt 7 typically installed in vehicles. The exemplar vehicle safety belt 7 is a three-point occupant restraint that crosses an occupant's lap and again across the occupant's chest. The base assembly 10 may also include provisions for connection with LATCH anchors typically available in passenger vehicles.

Figure 2:
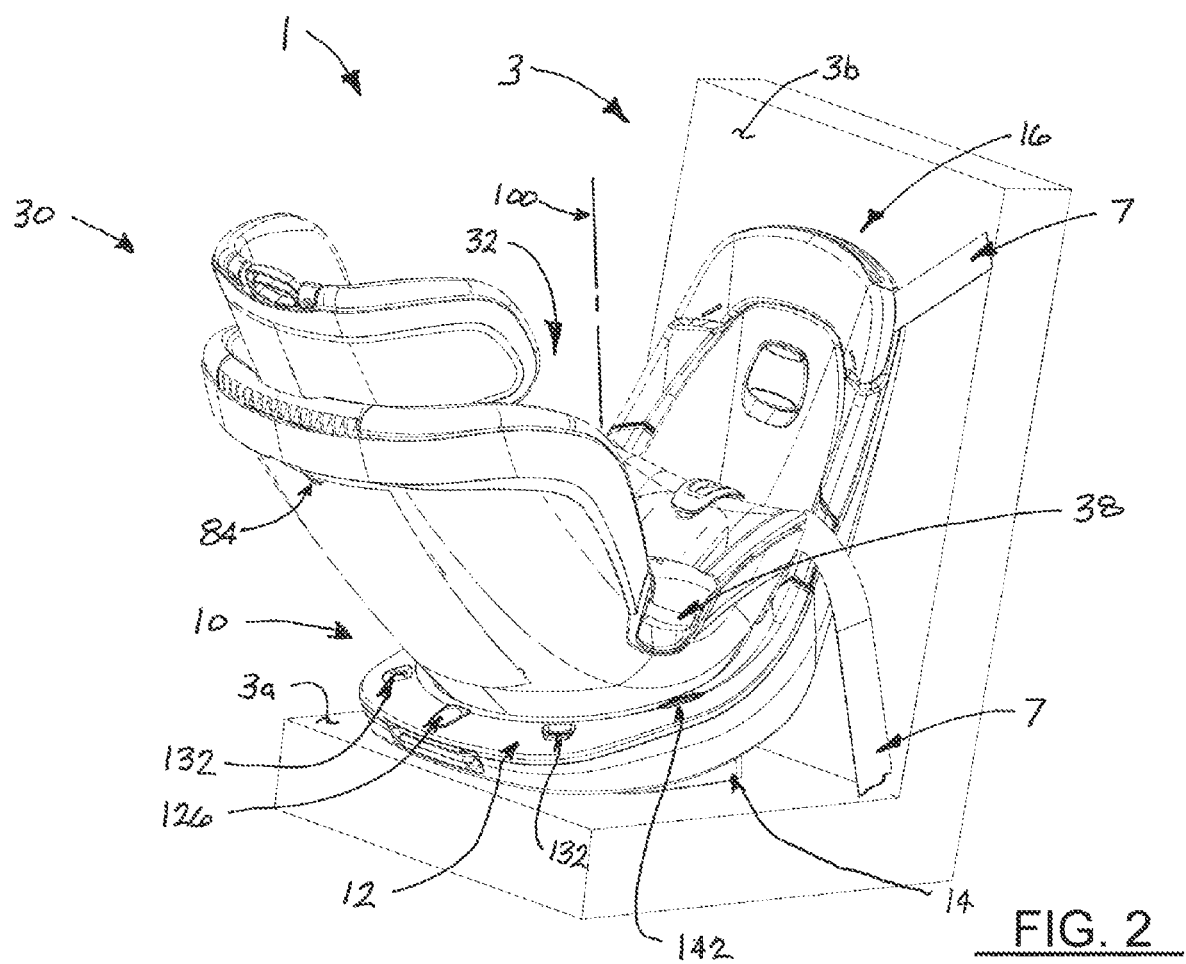
FIG. 2 is a perspective view of the child safety seat of FIG. wherein the child seat orients the occupant in a rearward facing position.
Figure 3:
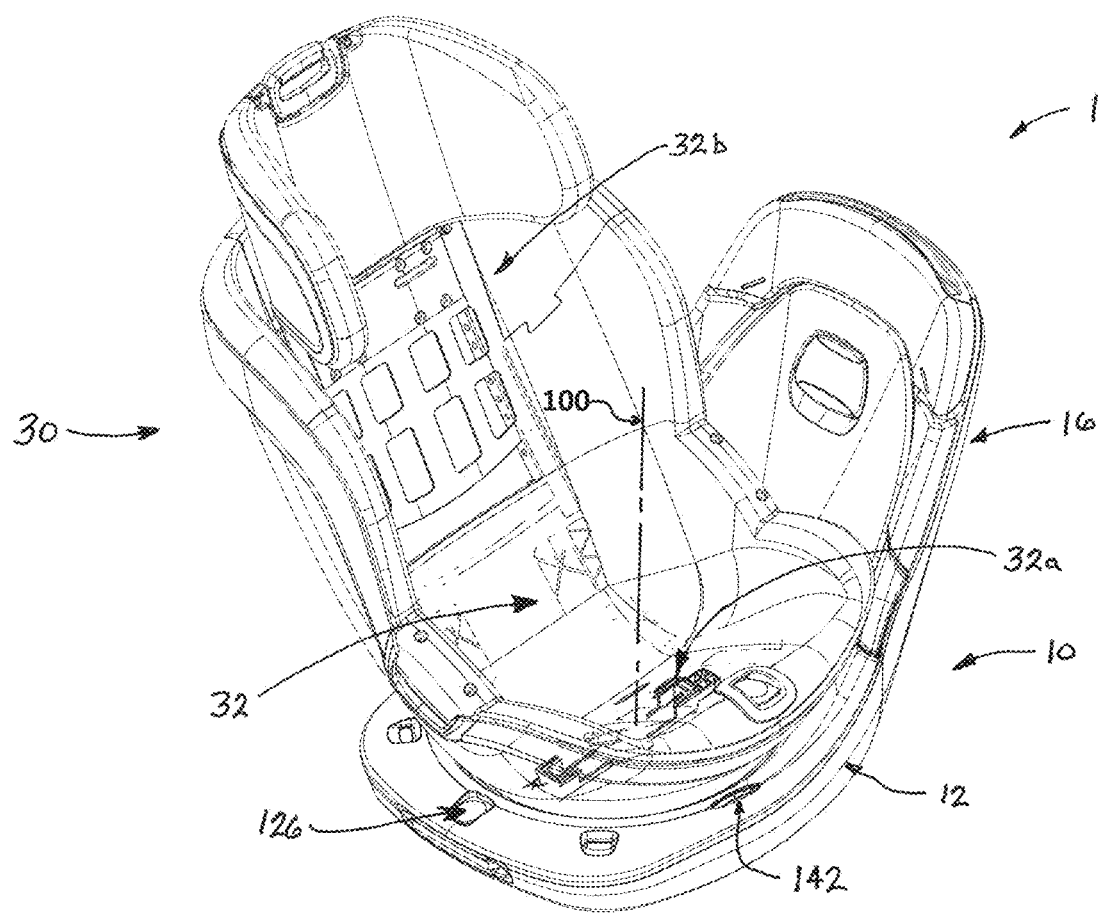
FIG. 3 is a perspective view of the child safety seat of FIG. wherein the child seat is oriented side facing to improve access to the occupant for positioning in or removing from the seat.
Figure 4:
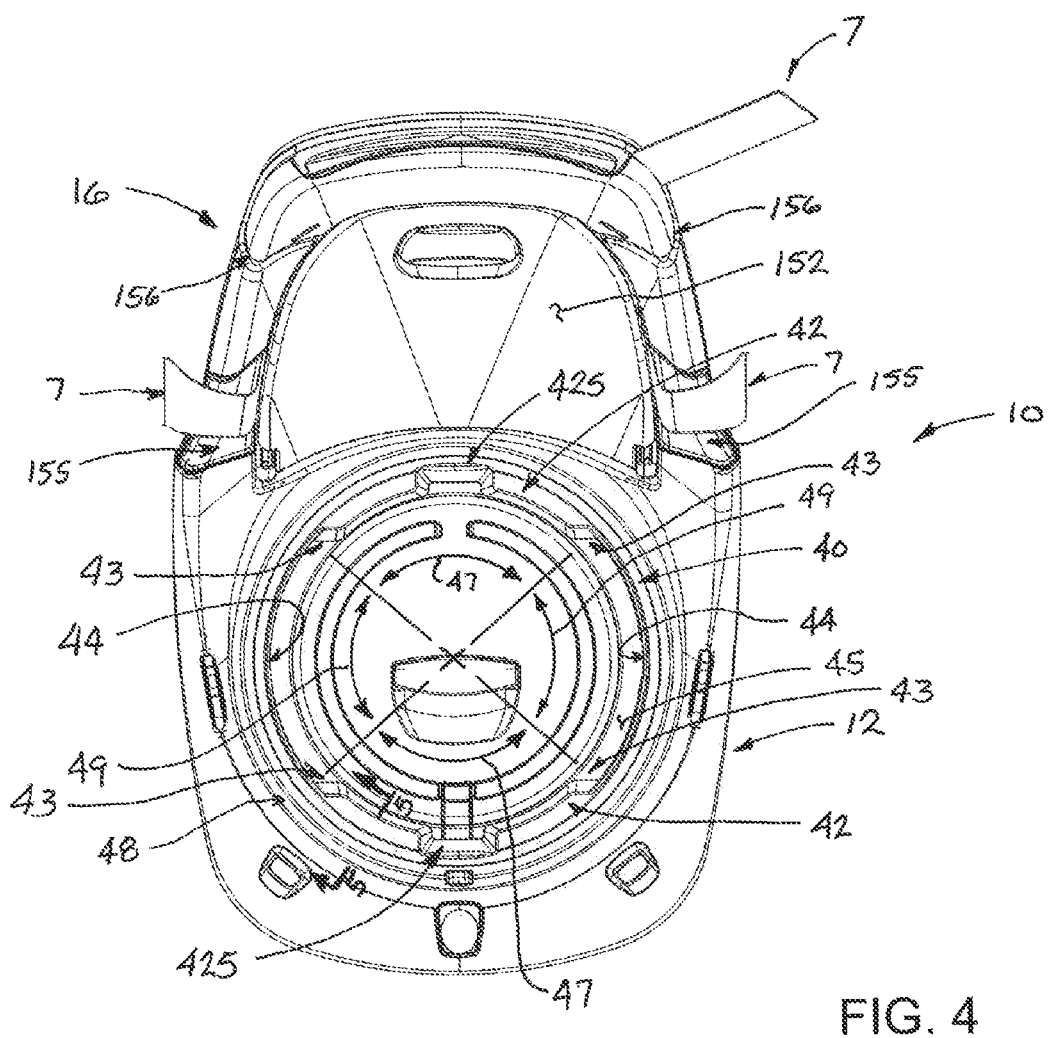
FIG. 4 is a plan view of the base assembly detailing the connector interface.
Figure 5:
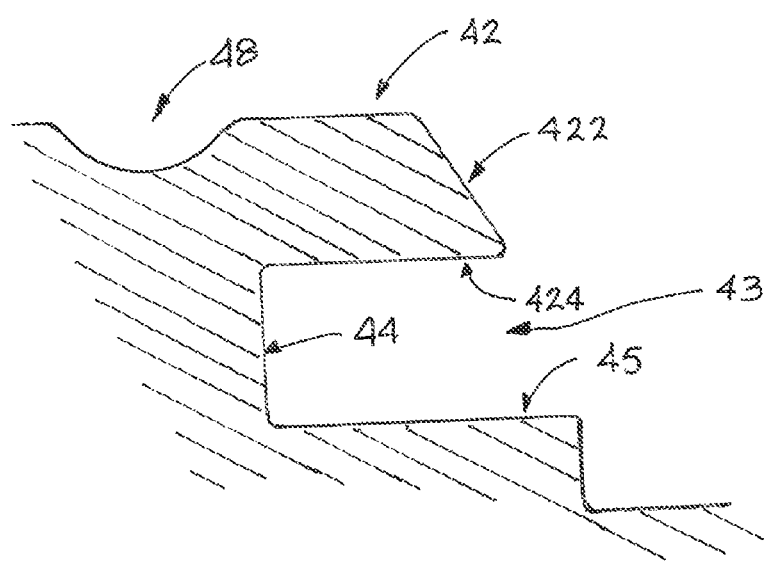
FIG. 5 is a section view of a portion of the base assembly connector interface shown in FIG. 4 viewed along cut line 5-5.
Figure 6:
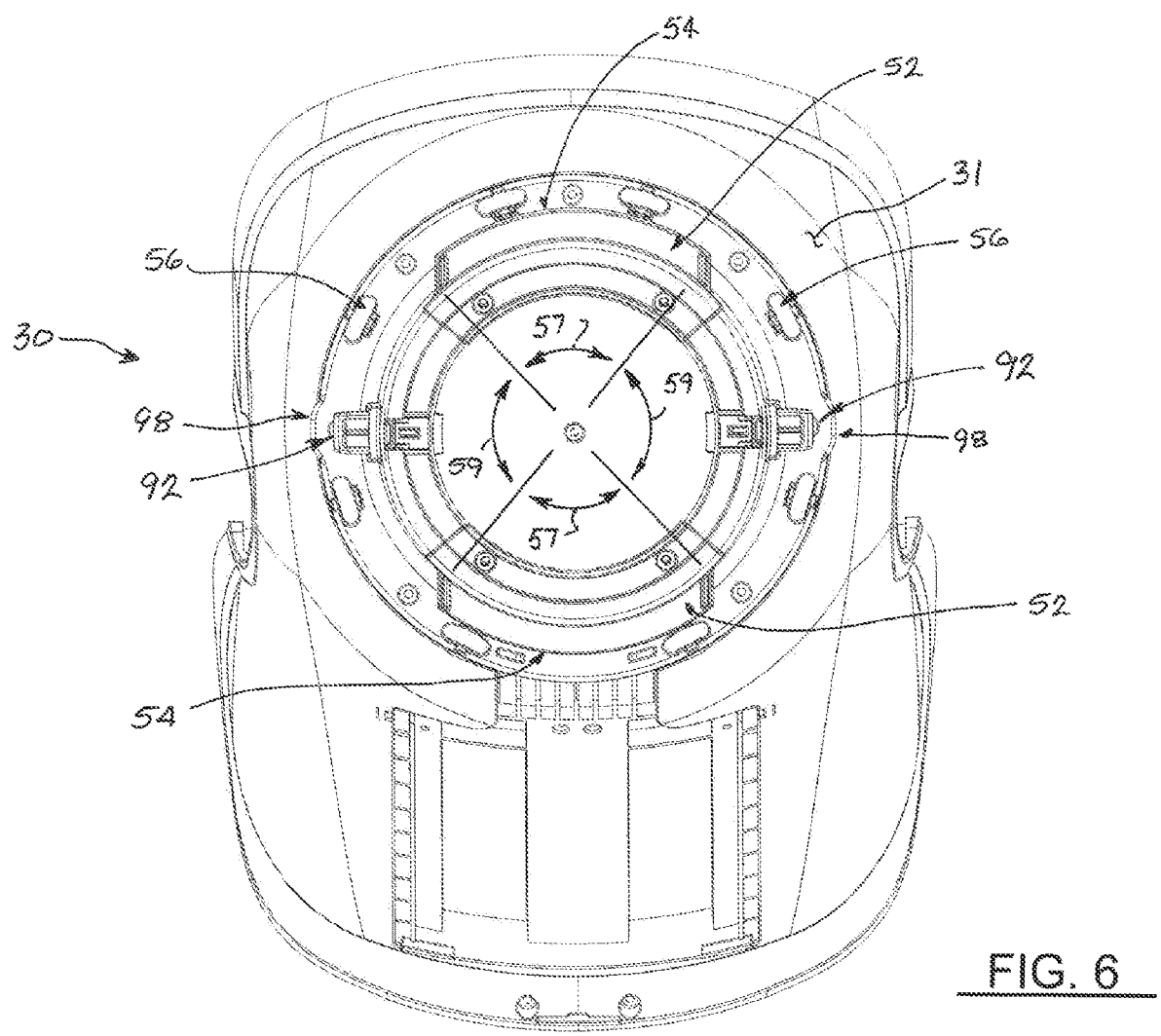
FIG. 6 is a bottom view of the connector interface on the lower surface of the seat shell.
Figure 7:
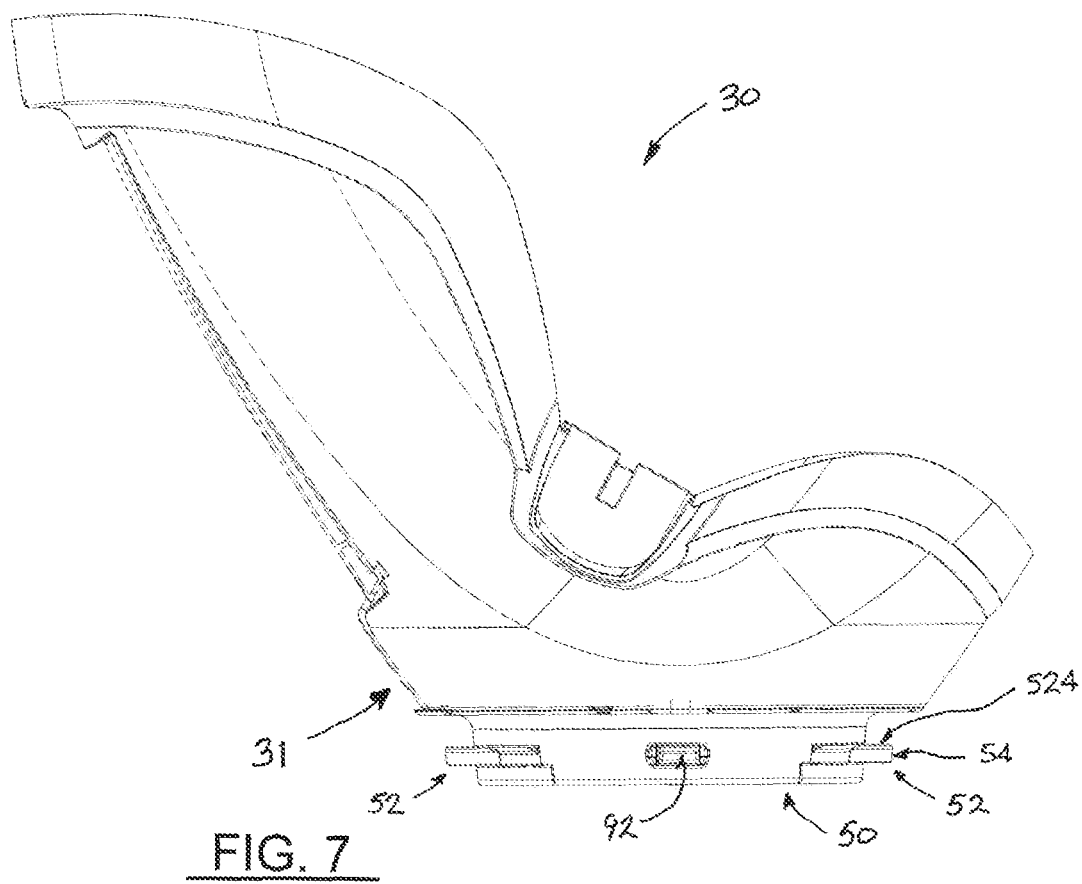
FIG. 7 is a side elevation view of the seat shell showing the configuration of the connector interface.
Figure 8:
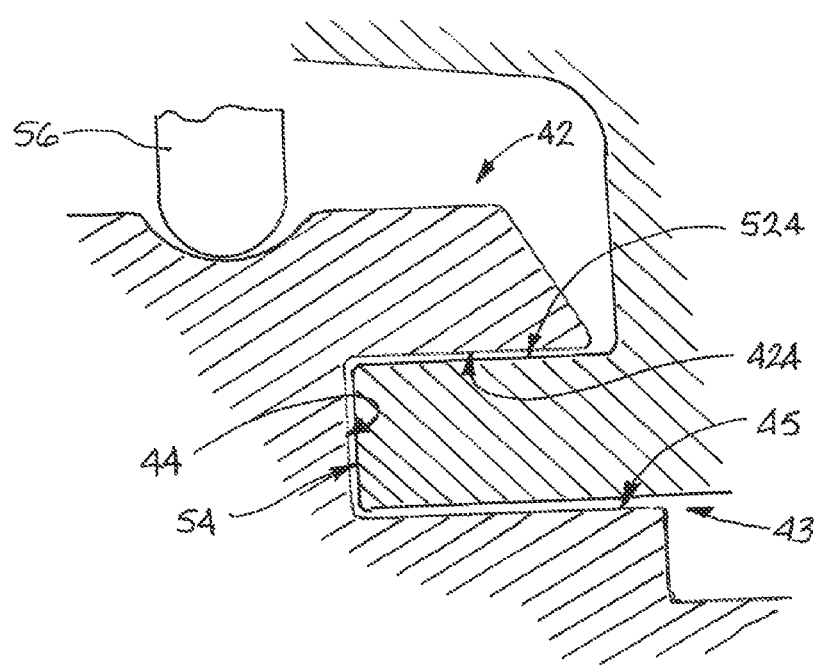
FIG. 8 is the partial section view of FIG. 5 showing a portion of the second retainer to illustrate the spatial relationship of the retainers in the connector interface when the seat shell is installed.

A seat shell 30 is moveably connected to the base assembly 10 and includes an interior space 32 defining a seating surface 32a and a backrest surface 32b configured to receive a child occupant. The connection between the base assembly 10 and the seat shell 30 enables the seat shell to be selectively positioned between a forward-facing orientation (FIG. 1) suitable for larger child occupants, a rearward-facing orientation (FIG. 2) suitable for infant occupants, and a side-facing orientation (FIG. 3) which improves access to the seat shell for positioning into or removing from the seat shell an occupant. The seat shell 30 may be oriented to face either side in the side-facing orientation to enable realization of the benefits of the safety seat when installed on either side of a vehicle.

In a first aspect of the invention, a connector 20 is provided to selectively attach the seat shell 30 to the base assembly 10 in a manner allowing the seat shell to swivel 360 degrees about a generally upstanding rotational axis 100. The connection also allows the seat shell 30 to be fixedly aligned in one or more predetermined orientations, including at least forward-facing and rearward-facing orientations of the seat shell. The connector 20 also allows the seat shell 30 to selectively be detached from the base assembly 10. The seat shell is detached from the base by positioning the shell in one of the two side facing orientations and actuating a release mechanism to permit the shell to be lifted in the direction of the rotational axis 100 and separated from the base when in such orientation.

Referring specifically to FIGS. 4 through 8, the connector 20 comprises a generally circular first interface portion 40 in the base assembly 10, the first interface portion comprising a pair of first retainers 42 and a first lateral bearing portion 44 symmetrically arranged about the rotational axis 100. The first lateral bearing portion 44 is defined by a wall arranged on a circular perimeter upwardly projecting from a floor surface 45. The first retainers 42 project inwardly from the first lateral bearing surface 44 and include a first vertical bearing surface 424 which is generally parallel to and spaced apart from the floor surface 45 forming a base channel 43 therebetween that extends partially around the periphery of the lateral bearing portion 44. The first retainers 42 may also include an inwardly sloped upward facing surface 422 to aid guidance of the seat shell into the connector 20. The first retainers 42 are symmetrically arranged arcuately about a portion of the first lateral bearing surface 44. In the preferred exemplar embodiment, two first retainers 42 are provided and symmetrically positioned about the circular perimeter, each spanning a first retainer sector 47. A pair of first gap sectors 49 is defined along the circular perimeter of the lateral bearing portion between the first retainers 42. The measure of the gap sectors is greater than the measure of the first retainers.

Connector 20 also comprises a generally circular second interface portion 50 disposed on the lower exterior surface 31 of the seat shell 30 also symmetrically arranged about the rotational axis 100. The diameter of the second interface portion 50 is sized to enable it to nest within the first interface portion 40. The second interface portion 50 includes a pair of second retainers 52 that extend radially outwardly. Each of the second retainers 52 include a second lateral bearing surface 54 and a second vertical bearing surface 524. Second retainers are symmetrically arranged about a portion of the periphery of the second connector interface 50, the second lateral bearing surfaces 54 defining a circular perimeter having a diameter that is slightly less than that of the first lateral bearing surface 44. When the seat shell 30 is engaged with the base 10, the second retainer 52 is positioned in the base channel 43 such that the second lateral bearing surface 54 is positioned adjacent to and in sliding contact with the first lateral bearing surface 44 in the base channel 43 in a manner which defines a rotational center for the seat shell coinciding with rotational axis 100. The first and second vertical bearing surfaces 424, 524 may also be in sliding contact dependent upon the rotational orientation of the seat shell 30. Small gaps between the lateral bearing surfaces may exist within the defined sliding contact, but sufficient contact exists in the entirety of the interface to constrain the seat shell rotation to that generally about the rotational axis 100. In the exemplar embodiment, two second retainers 52 are provided and symmetrically positioned about the periphery of the second connector interface, each spanning a second retainer sector 57. A pair of second gap sectors 59 is defined along the circular perimeter of the lateral bearing portion between the second retainers 52. The measure of the second gap sectors is greater than the measure of the second interface portions.

The actual measure of first and second retainer sectors 47, 57 and first and second gap sectors 49, 59 may be varied provided that the measure of the gap sectors 49, 59 is greater than the measure of the retainer sectors 47, 57. The connector interfaces may also vary in the number of retainers and gap sectors provided the number of gap sectors equals or exceeds the number of retainers and the gap sectors are greater in measure than the retainer sectors. The symmetric pairs are preferred to permit two possible alignments of the seat shell for detachment from the base corresponding to a side-facing orientation of the seat shell in either direction.

The first and second retainers are structurally reinforced to withstand the forces created during vehicle crashes and retain the seat shell attached to the base. Surfaces in sliding contact such as first lateral bearing portion 44, second lateral bearing surface 54, first vertical bearing surface 424, and second vertical bearing surface 524 may include a friction-reducing covering to improve quality of movement of the seat shell.

The connection of the seat shell 30 to the base assembly 10 is accomplished by orienting the seat shell 30 to a side facing orientation. In this configuration, the second retainers 52 are aligned with the arcuate gap sectors 49, 59 between the two first retainers 42 on the base assembly. The measure of the gap sectors 49, 59 is greater than the measure of the retainer sectors 47, 57 which assures that the second retainers 52 may move through the open space of the first gap sectors 47 and that the first retainers 42 may move through the open space of the second gap sectors 57 when the seat shell is properly aligned. The configuration allows the seat shell 30 to be lowered in relation to the base assembly 10, generally in the direction of rotational axis 100 until the first and second retainers 42, 52 are generally adjacent. Rotating the seat shell 30 engages the respective retainers 42, 52 in an overlapping arrangement that inhibits substantial upward movement of the shell and constrains the seat shell to rotational movement. By configuring the first and second retainers 42, 52 to span arcuate sectors that measure less than the open gap sectors 49, 59, the retainers 42, 52 may be disengaged by aligning the second retainers 52 on the shell 30 with the gap space 49 on the base assembly 10 which coincidentally aligns the first retainers 42 on the base with gap sectors 59 on the seat shell.

The generally circular configuration and the spatial configuration of the overlapping interface of the respective retainers and bearing surfaces preclude significant vertical displacement and limit relative motion between the seat shell and base to rotational when the seat shell is engaged with the base.

The base assembly 10 may further include a generally circular support track 48 positioned adjacent to the periphery of the first interface portion 40. The seat shell 30 may include a plurality of support wheels 56 circularly arranged so that the wheels engage the circular track 48 when the seat shell is connected to the base assembly. The support wheels 56 bear the weight of the seat and occupant and allow the seat shell 30 to be more easily swiveled (rotated) in relation to the base assembly and stabilize the connection. The circular track 48 may also be configured to constrain the movement of the support wheels 56 and further contribute to limiting motion of the seat shell to rotational. Alternative designs providing friction-reducing bearings and the like are contemplated in lieu of the support wheels.

Figure 9:
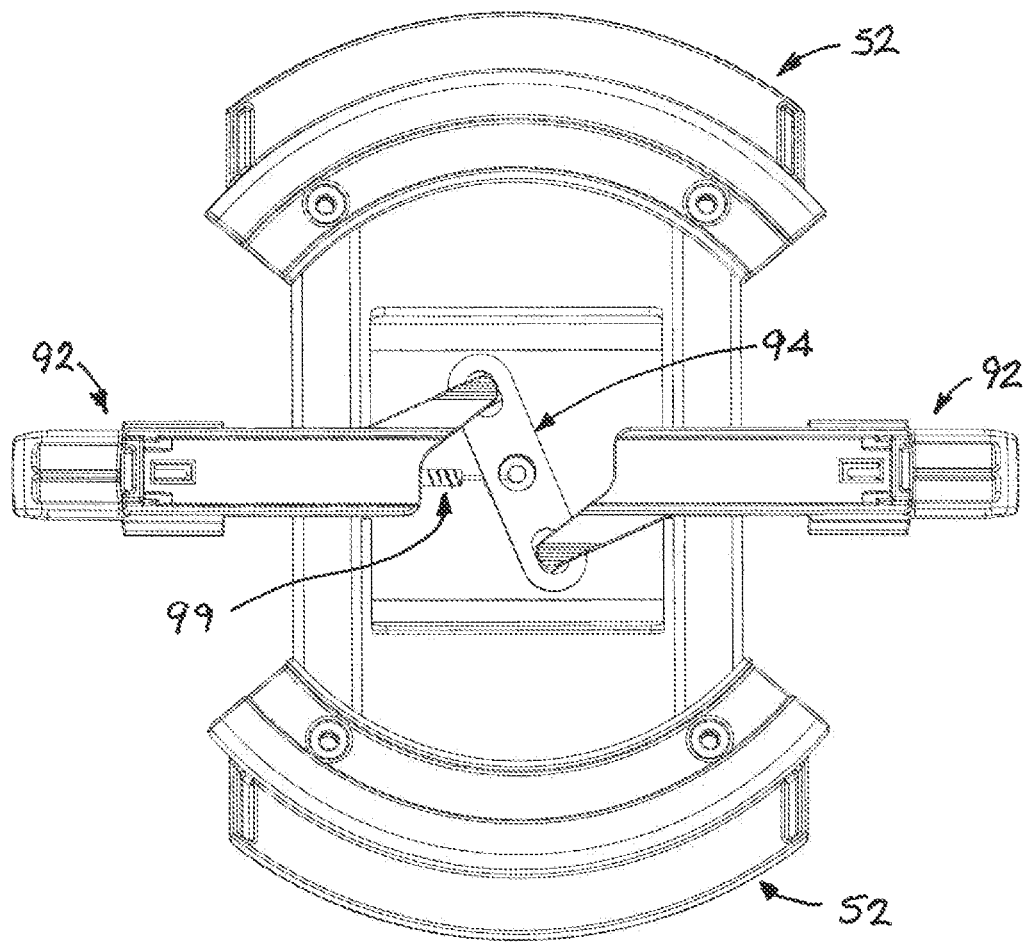
FIG. 9 is a partial view of the latching mechanism used to retain the seat shell attached to the base assembly viewed from beneath the seat shell.
Figure 10:
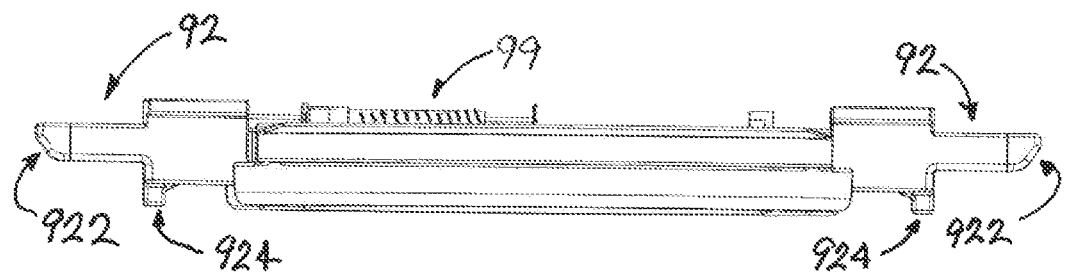
FIG. 10 is a partial elevation view of the latching mechanism shown in FIG. 9.
Figure 11:
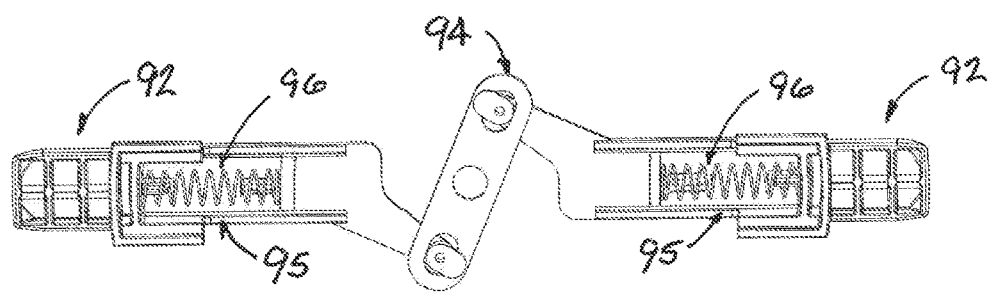
FIG. 11 is a partial reverse view of the latching mechanism of FIG. 9 illustrating the biasing means.
Figure 12:
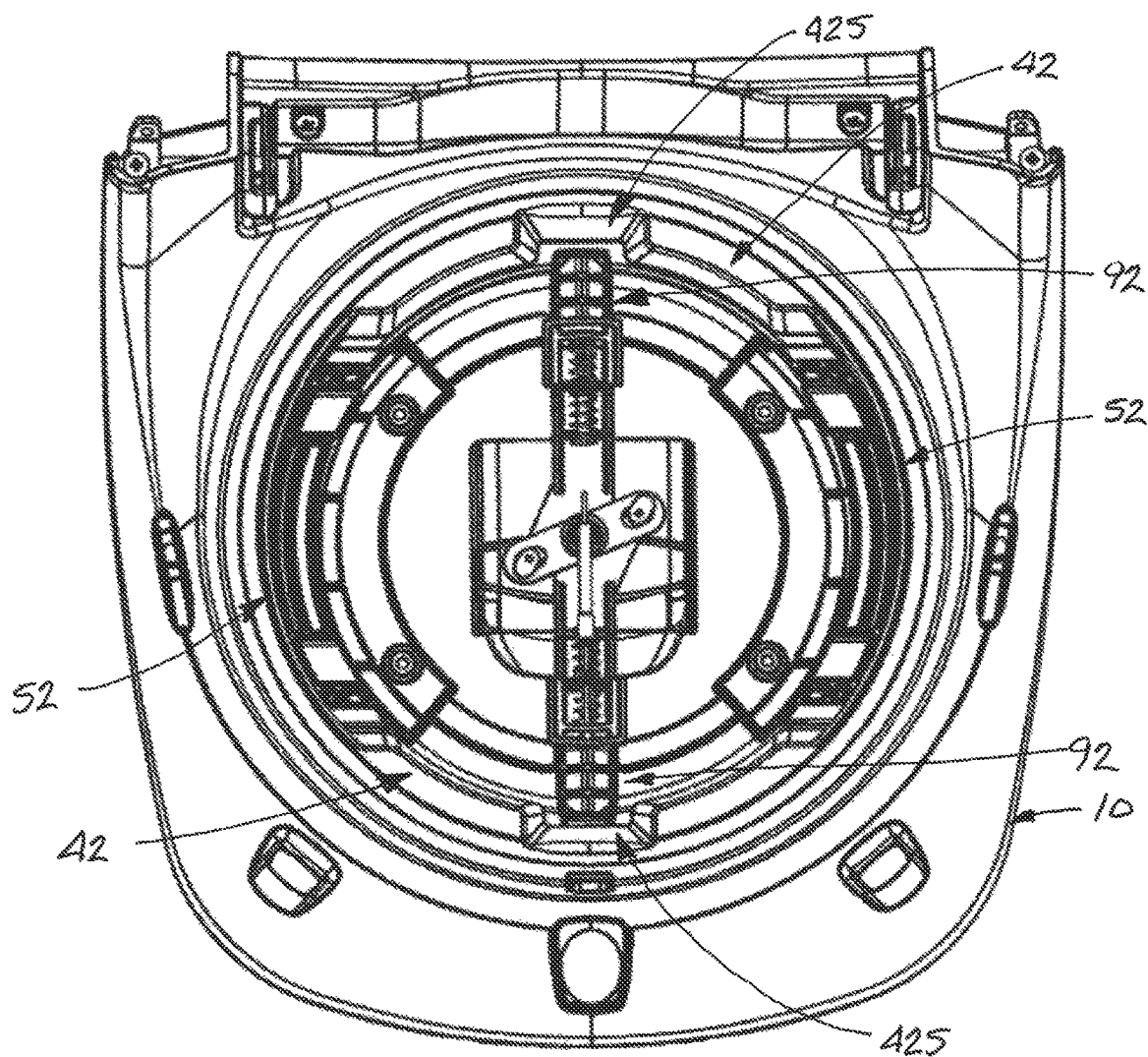
FIG. 12. shows the connector with the second connector interface and latching mechanism aligned for removal of the seat shell.

A latching mechanism 90 comprising a pair of moveable latch members 92 disposed in the second interface portion 50 of the seat shell 30 precludes inadvertent separation of the seat shell 30 from the base assembly 10 when operably attached. Movement of the latch members 92 is coordinated for simultaneous movement by a link member 94 (FIGS. 9-11) which is pivotally connected to the second interface portion 50; movement of the latch members is linked for simultaneous movement inwardly toward a release position or outwardly toward a latched position. The latch members may be slidably connected to arms 95 wherein one or more resilient members 96 may be used to bias the latch members 92 toward the outwardly displaced latched position to allow seat shell attachment to the base while minimizing movement of the latching mechanism release. Movement of the latch members 92 inwardly toward the release position is operably effected by a user operating one or both latch release handles 38 conveniently disposed on the seat shell and operably connected to the latching mechanism by a pull cable 99 or linkage.

Alternatively, the latching mechanism may be disposed on the base assembly and a releasing mechanism disposed either on the base assembly or on the seat shell to provide the same functionality.

The latch members 92 are preferably oriented laterally in relation to the seat shell. Each of the latch members 92 includes a tapered end 922. Each first retainer 42 in the base assembly 10 includes a notch-like guide structure 425 in the retainer which is configured to engage the latch members while allowing the latch members 92 to pass from above to below the first retainer 42 as the seat shell 30 is lowered onto the base assembly during seat shell attachment. The guide structures 425 are preferably disposed longitudinally in relation to the seat shell and base assembly so that the latch members 92 will be aligned therewith when the seat shell is in a side-facing orientation. The guide structure 425 and the tapered ends 922 are tapered in a complimentary arrangement that reduces friction and reduces the inward displacement of the latch members necessary to permit them to pass beneath the first retainer 42 as the seat shell is lowered into attachment with the base assembly.

The latch members 92 also secure the seat shell rotationally to in either the forward- or rear-facing orientations. A pair of locking recesses 46 are provided in the first lateral bearing surface 44 and are sized to receive the latch members 92 when outwardly displaced. The locking recesses 46 are positioned along transverse axis 103 so that the latch members are similarly aligned only when the seat shell 30 in in the either the forward- or rear-facing orientations. When so positioned, the latch members extend outwardly into the locking recesses 46 to prevent rotation of the seat shell 30 unless the latch release handles 38 are operated to withdraw the latch members.

Figure 13:
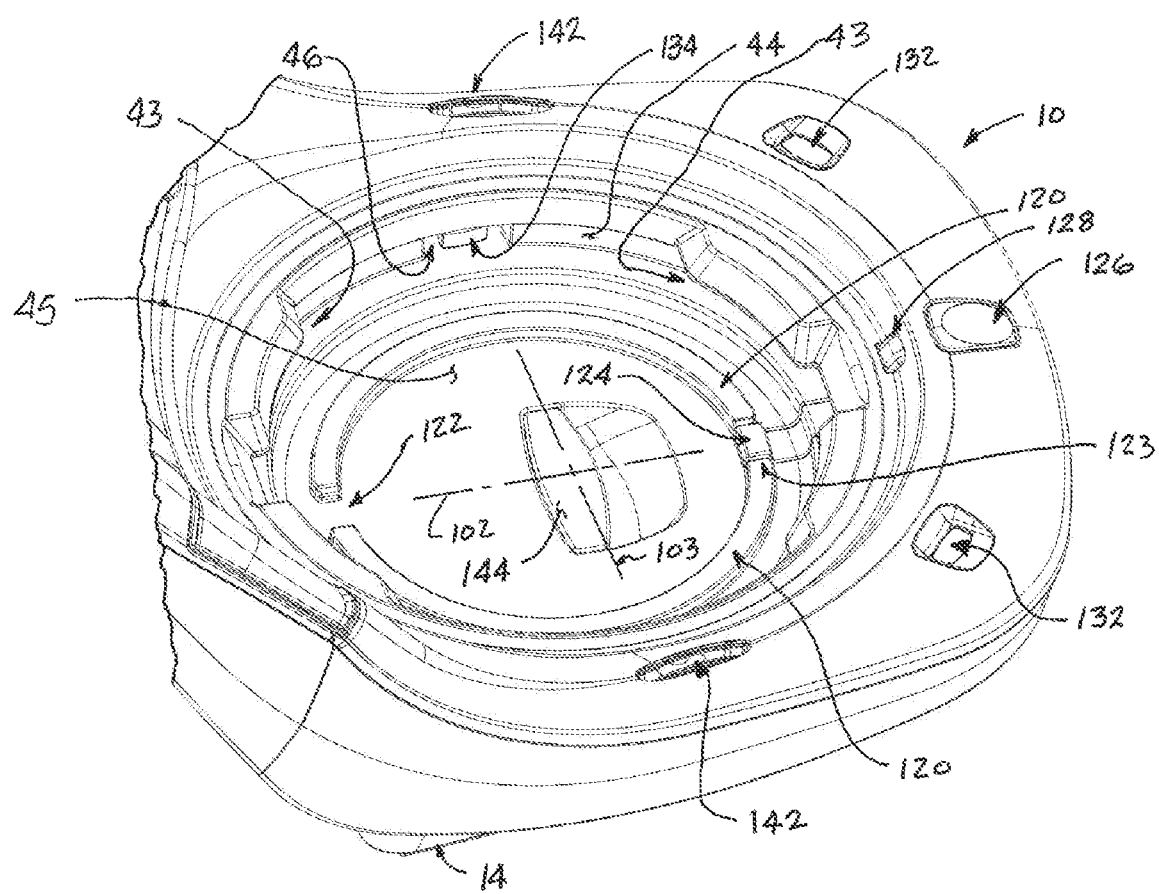
FIG. 13 is a partial perspective view of the base assembly detailing the blocking structure managing operation of the latching mechanism FIGS. 14 and 15 provide detail views of the blocking structure and the latching mechanism.
Figure 14:
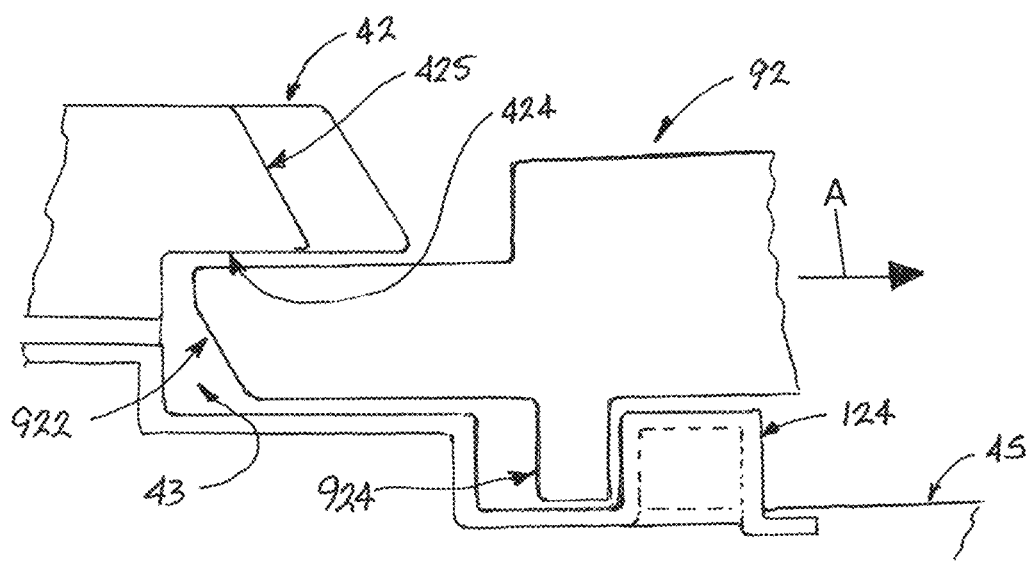
Figure 15:
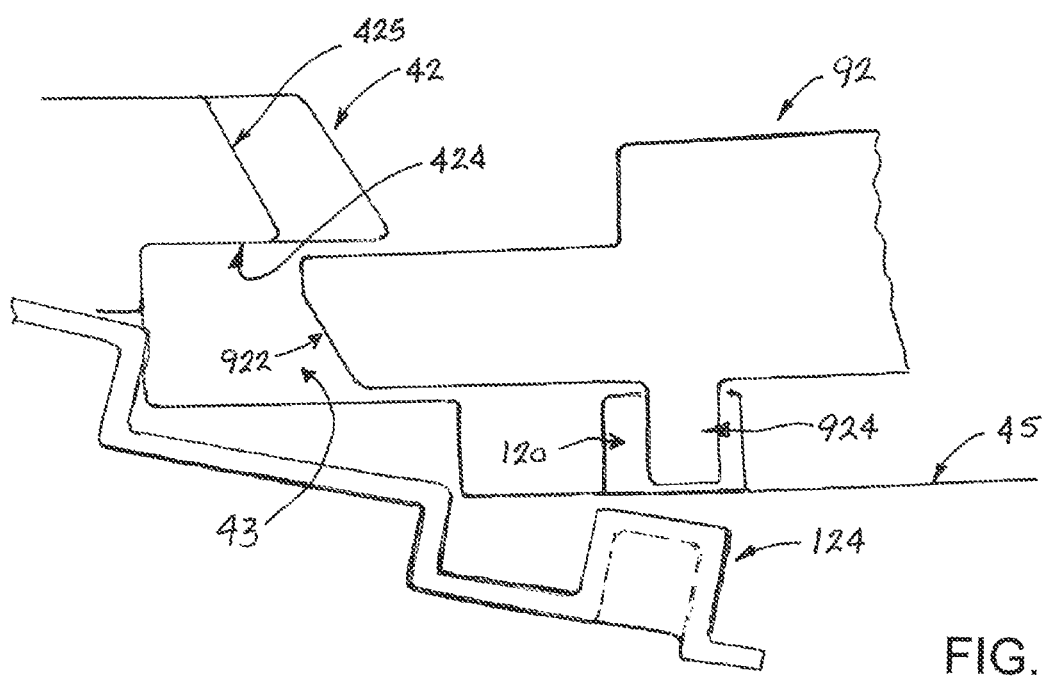

Inadvertent release of the latching mechanism 90 and thereby inadvertent separation of the seat shell 30 from the base assembly is prevented by a two-step releasing procedure. Referring to FIGS. 13 through 15, the base assembly includes a blocking structure 120 that projects upwardly from the floor surface 45 of the base assembly 10. The blocking structure 120 is circularly configured and disposed inwardly concentric to the wall structure of the first lateral bearing portion 44 and generally continuous excepting a pair of openings 122, 123 positioned along a fore-aft axis 102 of the base assembly 10. A movable blocking tab 124 is provided in the forward opening 123 allowing movement between positions blocking (FIG. 14) or unblocking (FIG. 15) the opening 123. The latch members 92 include a blocking extension 924 which are positioned radially outwardly and adjacent to the blocking structure when the seat shell 30 is attached to the base assembly 10. The blocking tab 124 prevents unlatching movement of the latch member 92 by blocking inward movement in the direction "A" (FIG. 14) when in the blocking position. When the blocking structure 124 is moved to the unblocking position, the blocking extension 924 may freely pass through the foremost opening 123 in the blocking structure 120 so that the latch member 92 may disengage the first retainer 42. The fore-aft positioning of the openings 122, 123 coincides with the position of the latch members 92 when the seat shell 30 is oriented in either side-facing configuration. It also aligns the latch members with the guide structures 425 which have an inner circumference greater than that of the first retainer 42 to reduce the displacement of the latch members 92 necessary to disengage the seat shell. The interlocking relationship of the latch members allows blocking of either latch member to prevent inward (unlatching) movement of either.

An unlatching actuator 126 is operably connected to the blocking tab 124. The blocking tab 124 is biased toward the blocked position; depressing the unlatching actuator 126 moved the blocking tab to the unblocking position. A ratcheting actuator 128 is provided to retain the unlatching actuator in the depressed position. Without operating the ratcheting actuator 128, a user must depress and hold the unlatching actuator 126 in order to detach the seat shell from the base assembly. A cam 98 is provided on the seat shell and configured to align with and depress the ratchet actuator only when the seat shell is properly aligned for detachment.

Further contributing to safety are indicator flags 132 disposed on the base assembly where they are easily viewed by a user. Alignment of the seat shell 30 in either the forward-facing or rearward-facing orientation positions the latch members 92 along transverse axis 103 and aligns them with locking recesses 46. Inwardly biased position sensors 134 are located in each of the locking recesses 46. Contact with the sensors 134 by the latching members 92 as they engage the locking recess displaces the position sensors 134 and causes the indicator flags to change state. Colors such as red or green or wording such as safe or unsafe may be displayed on the indicator flag indicating the state of the seat. As the safety seat is rated for occupancy in the forward- or rear-facing orientations, alignment of the seat shell in either of these orientations changes the state of the indicator flags 13 to indicate that the seat is correctly oriented for use.

Figure 16:
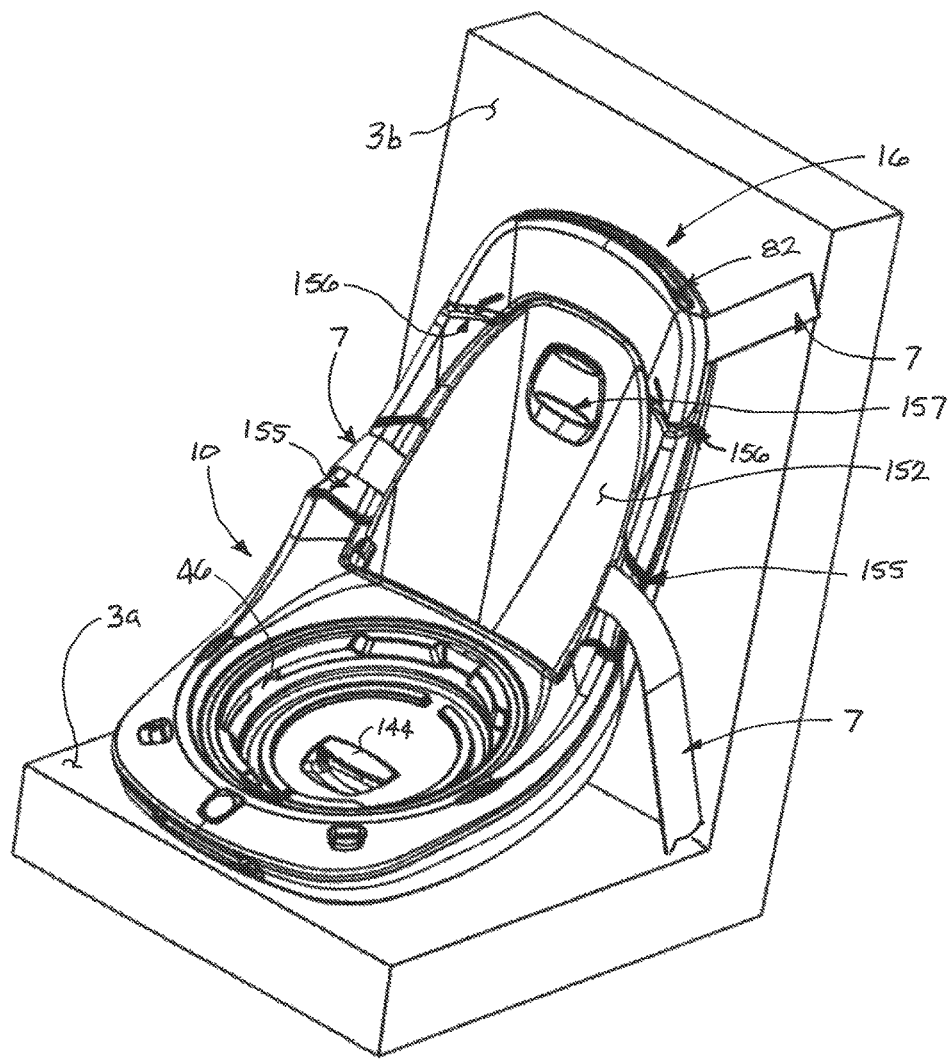
FIGS. 16 and 17 illustrate the base assembly features for securing the safety seat to the vehicle.
Figure 17:
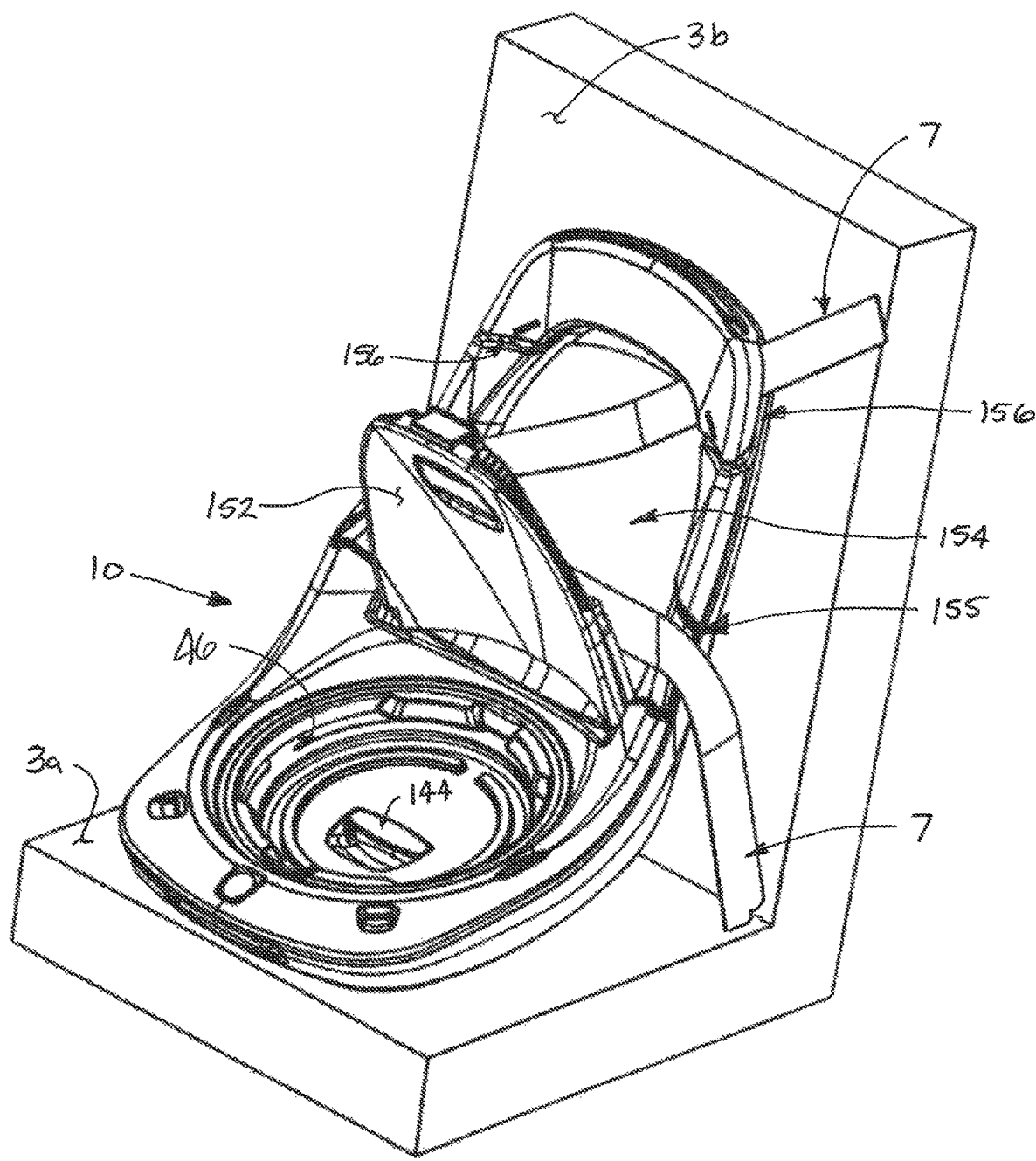
Figure 18:
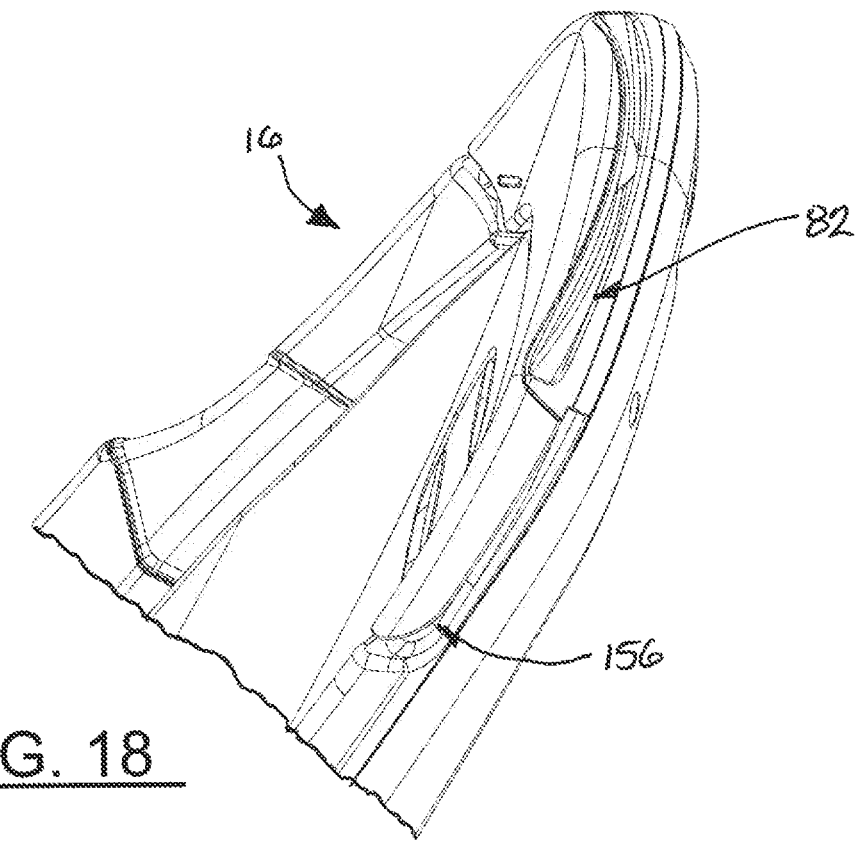
FIGS. 18 through 20 illustrate seat back structural reinforcement between the seat shell and the base assembly backrest that reinforces occupant harness anchoring when the seat is oriented forward-facing.
Figure 19:
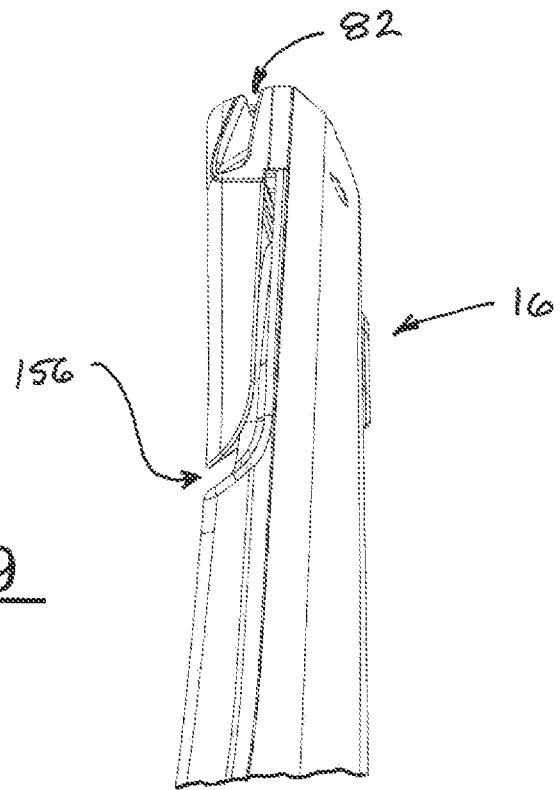
Figure 20:
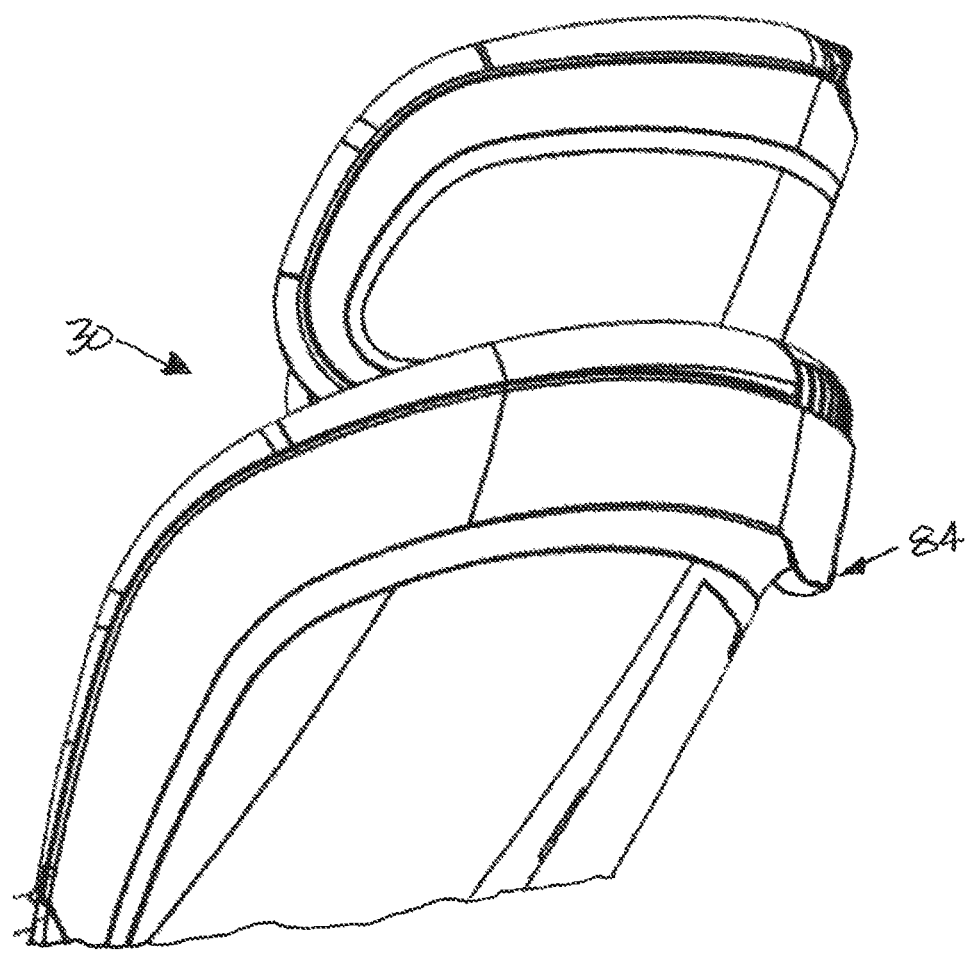

The base assembly 10 may be secured to the vehicle using the vehicle's conventional shoulder-lap (3-point) restraint that is engaged by the base assembly to retain the base assembly in a substantially fixed position in the vehicle seat. The base assembly 10 is provided with a back panel 152 which is disposed on the backrest portion 16 and moveable between a restraining position (FIG. 16) and a releasing position (FIG. 17). Moving the back panel 152 to the releasing position provides access to an interior cavity 154 of the backrest portion 16 through which the lap and shoulder portions of the vehicle safety belt 7 may pass. The lap belt portion engages lower guides 155 as it passes across the backrest portion 16, the guides being configured to maintain a desired position of the lap belt in relation to the base assembly 10. The shoulder belt portion is restrained by an upper guide 156. An upper guide 156 is provided on each side of the backrest portion 16 to allow the base assembly to be installed on either side of the vehicle. When the belt 7 is positioned in the upper and lower guides and tensioned using the conventional means present in the vehicle, moving the back panel 152 to the restraining position pushes the belt into the interior cavity 154, convoluting the belt 7 adjacent to the periphery of the back panel to further reduce slack in the belt and assure a secure attachment of the base assembly 10 to the vehicle. A releasing actuator 157 is provided to enable selective release of the back panel and removal of the base assembly from the vehicle.

The back panel 152 also prevents entanglement of the safety belt 7 by the seat shell 30 as it moves/swivels on the base. The safety belt 7 remains generally hidden from view of the infant when the seat shell is oriented rear-facing and thus does not pose a risk that the infant's feet could become entangled in the belt.

Securing the backrest portion 16 of the base assembly 10 to the vehicle allows the backrest surface 32b of the seat shell 30 to be structurally anchored to the vehicle thereby increasing the capability of the seat. A capture means comprising a reinforced receiving slot 82 provided in the top of the backrest portion 16 is configured to receive a reinforced tongue 84 provided on the exterior of the seat shell 30 proximate the distal end of the backrest surface. The reinforced tongue 84 is integral to the seat shell and rotates therewith. As the seat shell is rotated into the forward-facing orientation, the tongue 84 engages the receiving slot 82, structurally linking the backrest portion 16 and the upper back portion of the seat shell 30. The configuration of the receiving slot 82 provides other utility such as the connection of a mounting bracket, such as would be useful for mounting a mirror to allow a caregiver operating the vehicle to view the infant occupant when the seat shell is in the rear-facing orientation. Other useful features may also be provided for attachment to the safety seat using the receiving slot within the scope of the invention.

Referring to FIGS. 29 through 34, one example accessory mounting bracket 160 is shown. Accessory mount 160 provides for connecting an accessory to the backrest portion 16 of the base assembly 10 when the seat shell 30 is rotated into the rear-facing orientation. Accessory mount 160 comprises an attachment base 162 that is configured to be matingly coupled to an uppermost portion of the backrest portion 16 of the base assembly. The coupling engagement between the attachment base and the backrest is configured to minimize relative movement in the fore-aft and side-to-side directions.

The accessory mount is provided with a latching mechanism 170 configured to selectively engage the receiving slot 82 on the backrest and secure the accessory mount 160 to the base assembly. The accessory mount latching mechanism includes a lock frame 172 supporting a moveable locking member 174 that is bi-directionally moveable by an actuator lever 176 between opposing locked (FIG. 31) and unlocked positions (FIG. 32) corresponding to closed and open positions, respectively, of the actuator lever. Lock frame 172 includes an axle 178 pivotally coupling actuator lever 176 to the frame and a guide structure 179, 180 which guides movement of the locking member to sliding bi-directionally relative to the frame, and lever guide surfaces 181, 182. Actuator lever 176 is disposed within lever guide surfaces 181, 182 and rotatably connected to the lock frame and configured for rotation about axle 178 between the closed and open positions. The degree of actuator rotation is preferably approximately 90 degrees, corresponding to a quarter-turn of the actuator lever.

Locking member 174 includes a hook-like retainer 1742 with an inclined surface 1744 that is oriented to engage receiving slot 82 on the base assembly backrest when the accessory mount is positioned thereon and the latching mechanism moved into the latched position. As locking member 174 moves from the unlatched position toward the latched position, inclined surface 1744 contacts a lower edge 83 of receiving slot 82. Continued sliding movement of locking member 174 toward the latched position pulls the accessory mount toward the backrest as the contact point of the edge shifts along the inclined surface, urging the lock frame downwardly toward the backrest and thereby increases the stability and rigidity of the mount connection with the base assembly.

Figure 34:
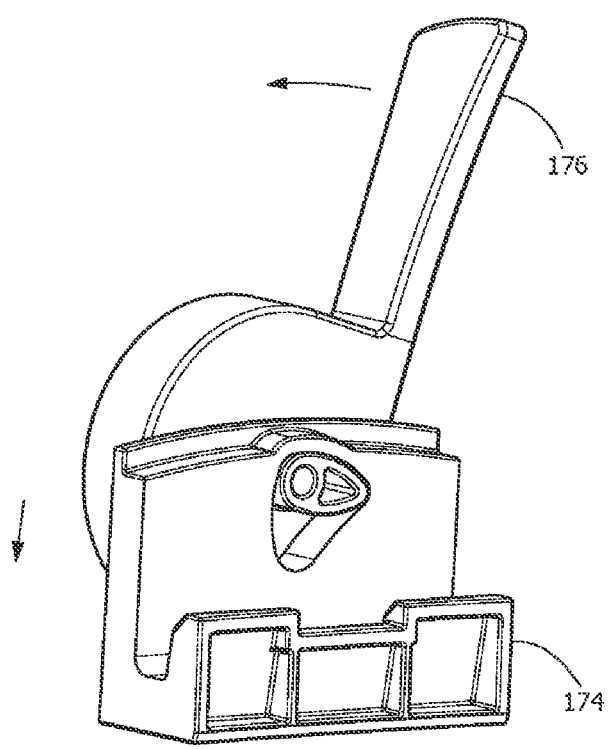
FIGS. 34 and 35 provide a partial detail view of the latching mechanism showing the interface between the actuator lever and sliding lock in the open and closed positions, respectively.
Figure 35:
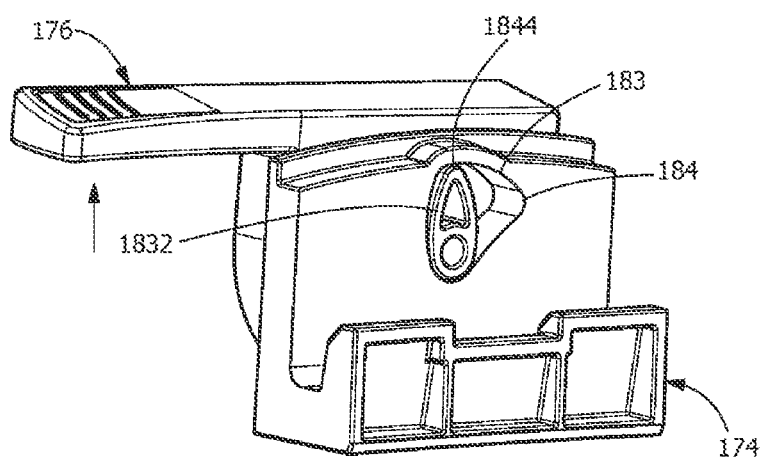

Referring to FIGS. 34 and 35, actuator lever 176 further includes a cam 183 configured for synchronous rotation with the lever. The cam 183 with a lobe 1832 engages a driving profile 184 to convert rotational movement of the lever into sliding movement of the locking member. Cam lobe 1832 is positioned in sliding contact with the driving profile 184. Moving the lever 176 toward the open position rotates the cam so that lobe is in contact with a first position 1842 of the profile which shifts the locking member from the unlatched toward the latched position. As the cam rotates, lobe 1832 slides along the driving profile 184 (counterclockwise as illustrated) toward a second position 1844 and urges the locking member toward the locked position. The ratio of locking member displacement to cam rotation in approximately the first half of the lever rotation is relatively high which rapidly shifts the locking member initially. Continued cam rotation reduces the ratio of locking member displacement to actuator rotation so that locking member displacement is lessened relative to the degree of continued actuator rotation. This portion of the motion corresponds to the engagement of the inclined surface with lower edge 83, increasing the clamping force between the accessory mount and the backrest portion. The reduced actuation ratio prevents a dramatic increase in the force a user must apply to fully latch the mechanism. The final portion of the lobe movement along the driving profile 184 slightly reverses the ratio of link displacement to cam rotation, slightly relaxing the sliding movement of the wedge link thereby creating a slight over-center condition to aid in maintaining the lever in the latched position.

Figure 21:
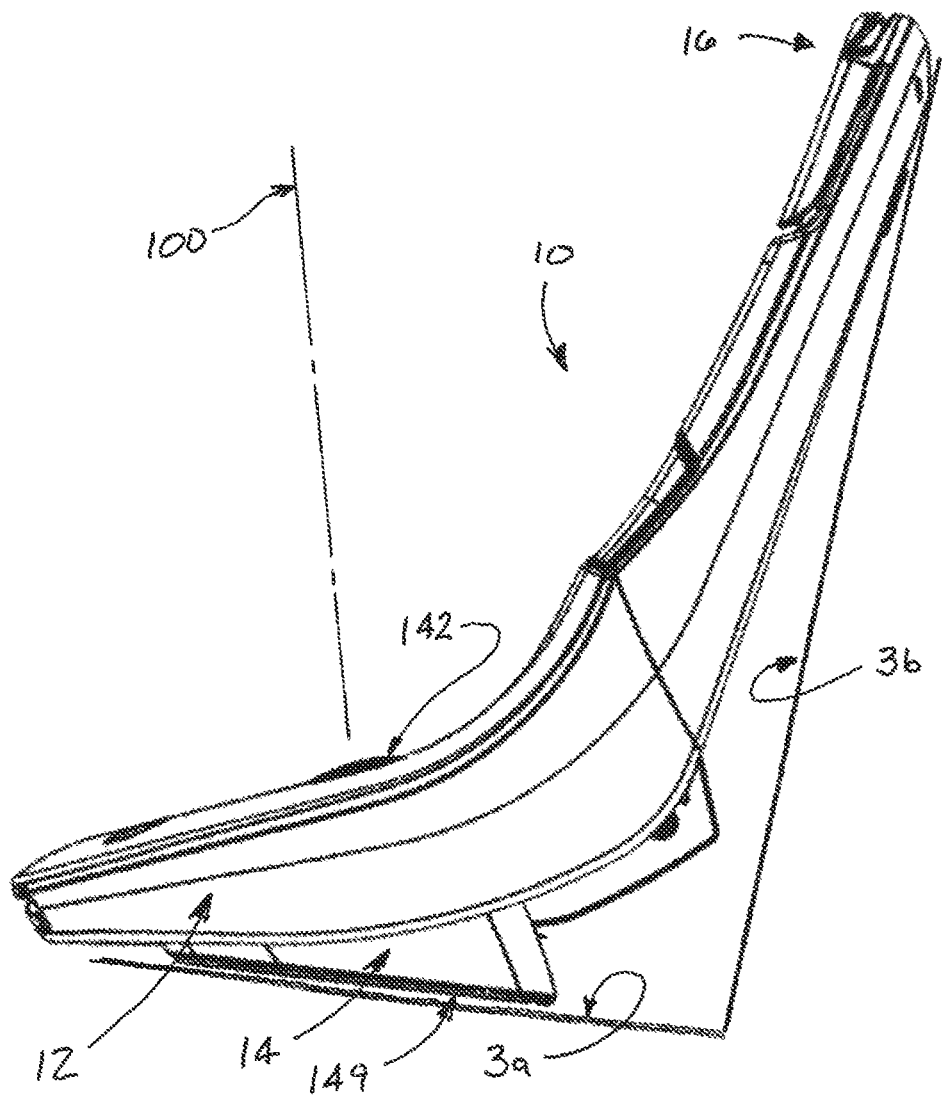
FIGS. 21 and 22 illustrate the base assembly inclination adjustment feature.
Figure 22:
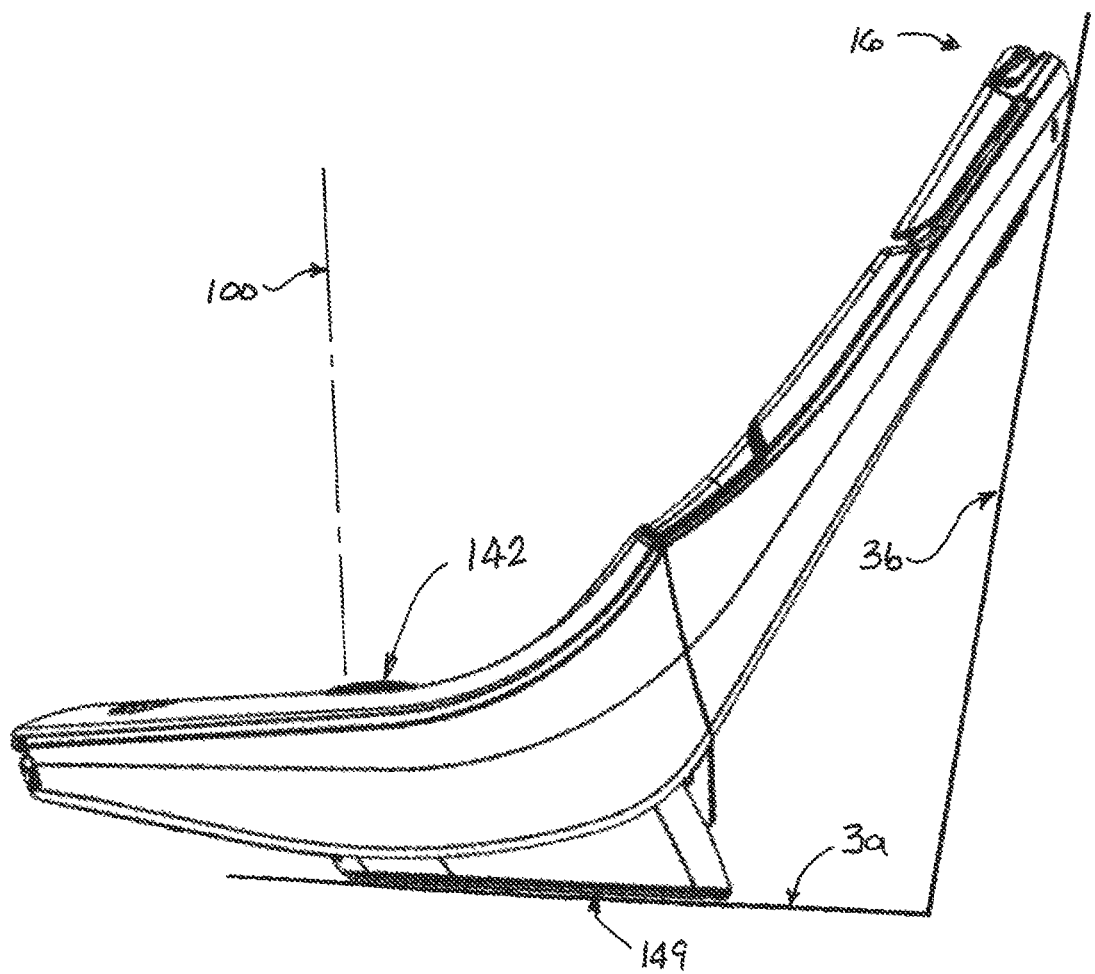

Referring to FIGS. 13 and 21-22, the base assembly 10 further includes a wedge adjuster 14 disposed on the base portion 12 which allows the base assembly 10 to be configured to securely fit into a variety of vehicle seats of different inclinations of the seating surface 3a to assure simultaneous adjacent contact by the base assembly 10 with both the seating surface 3a and the backrest surface 3b and ideal positioning of the base assembly. Typical vehicle rear seat surfaces are angled in a range of 2 degrees to 17 degrees rearward. The preferred orientation of the base assembly positions the rotational axis 100 approximately 4 degrees forward tilt from vertical. Wedge adjuster 14 is moveably connected to the base assembly 10 by a curved track including a positioning rack and a follower. Movement ranges between a maximum inclination (FIG. 21) to a minimum inclination (FIG. 22) encompassing approximately 15 degrees of inclination change between the two positions. A positioning actuator 144 located on the floor surface 45 of the base assembly allows selective disengagement of the follower mechanism from the positioning rack which in turn allows the wedge adjuster 14 to move along the curved track thereby changing the angle of its bottom surface 149 with respect to the base assembly 10. Once positioned, the user releases the actuator 144 to lock the wedge adjuster in a fixed position. Inclination indicators 142 may be provided on the base assembly to assist the use in properly orienting the base assembly 10 for installation on the vehicle seat. Other mechanisms may be easily incorporated to moveably connect the wedge adjuster to the base assembly in a manner accomplishing the same objective.

Figure 23:
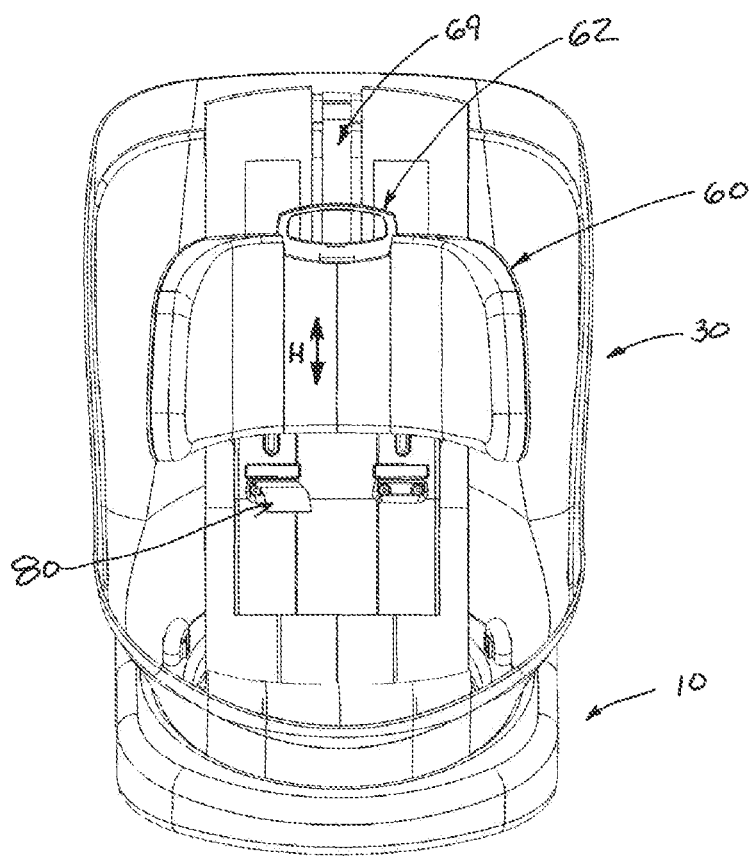
FIG. 23 is a view of the interior space of the seat shell illustrating a headrest adjustment provision.
Figure 24:
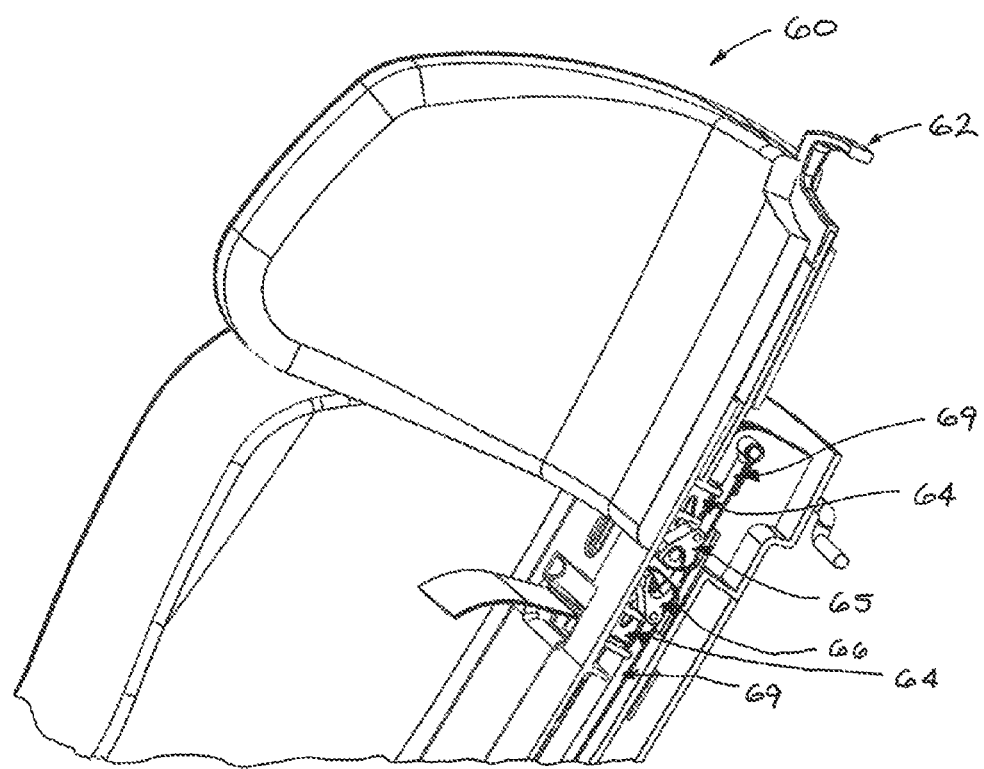
FIGS. 24 through 26 provide a partial cutaway view of the mechanism for fixing the adjustable headrest into position.

Referring now to FIGS. 23 through 26, the seat shell 30 may further comprise a head restraint 60 that is vertically moveable generally along the plane of the backrest portion 16, indicated by directional arrow "H" in FIG. 23. A headrest release mechanism may comprise a release handle 62 operably connected to an actuator cam 64 which adjusts the position of a pair of cam-locks 65, 66 which are engageable against a fixed anchor strap 69 disposed in the backrest portion 16. The cam-locks 65, 66 are oriented so that they are self-energized in opposite directions. The release actuator cam 64 is configured so that linear movement of the release handle in either direction from a neutral (engaged) position displaces the cam-locks 65, 66 from engagement with the anchor strap webbing and allows movement of the headrest.

Figure 25:
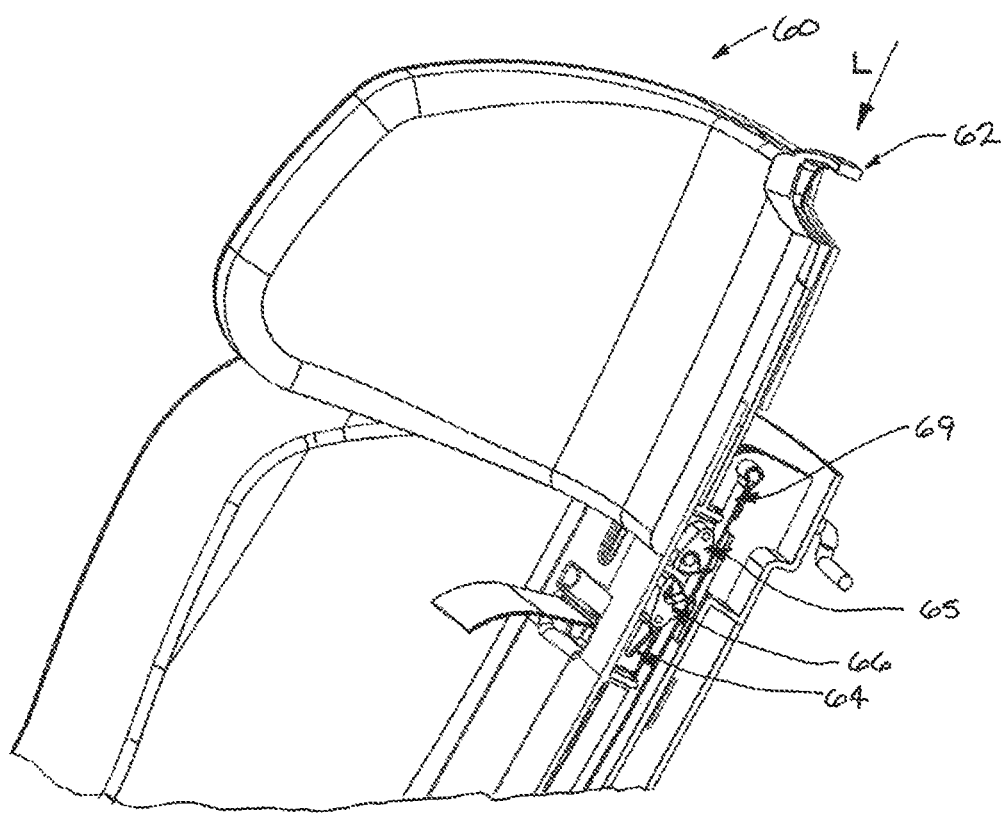
Figure 26:
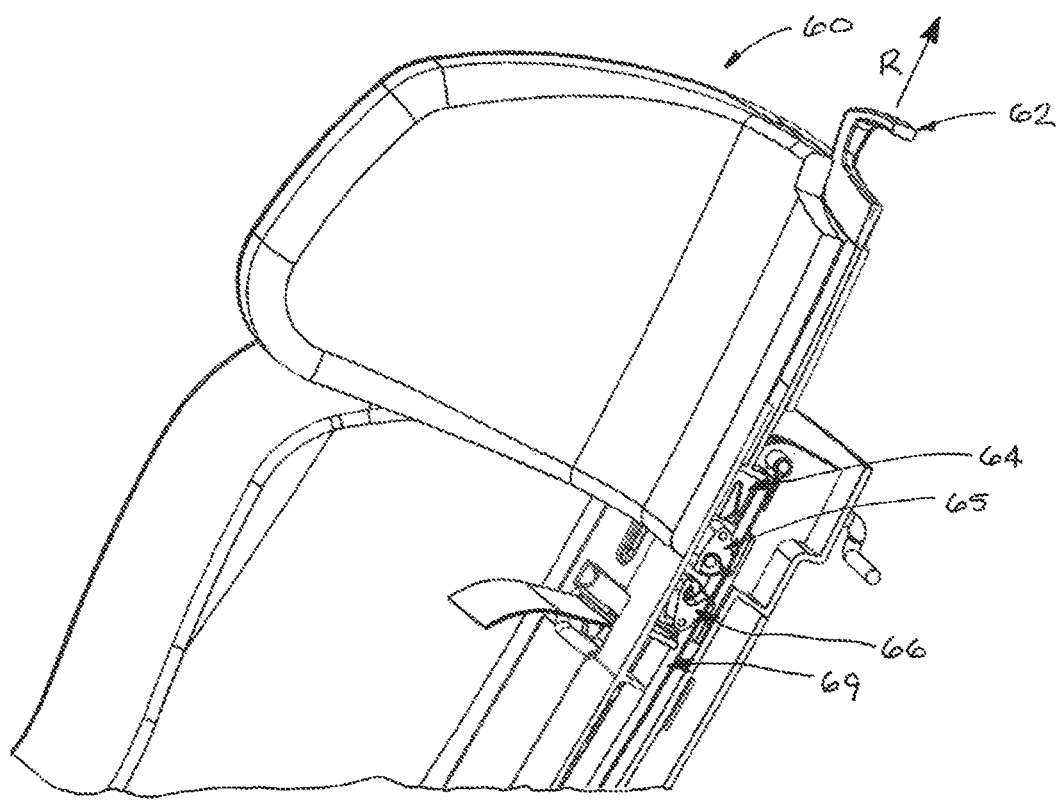

The release mechanism is further operable to allow headrest adjustment by pushing or pulling an actuator from a neutral position. In this way, the desired direction of movement of the headrest (raising or lowering) may coincide with the direction the release handle 62 is moved to enable headrest movement making headrest adjustment more intuitive. This is best illustrated in in FIGS. 25 and 26. In FIG. 25, the release handle 62 has been moved down, indicated by directional arrow "L", typical when the use wants to lower the head restraint 60. In FIG. 26, handle 62 has been raised, indicated by direction arrow "R", as would be typical for a user wanting to raise the head restraint 60.

The release mechanism is further configured to be low profile so that the "thickness" of the seat shell 30 back in which the adjusting mechanism is disposed may be maintained sufficiently thin to maintain the position of the seat shell sufficiently close to the vehicle seat back to minimize head and/or knee excursions during accidents and keep them within prescribed limits.

The adjustable head restraint 60 may also include a harness adjuster means 70 to provide desired slack in the infant harness belts 80 for convenience when securing infants in the seat while also accommodating a wider range of occupant sizes afforded by the adjustable headrest. The backrest surface 32b includes a guide track 72 for a moveable harness anchor member 74. The guide track 72 limits movement of the anchor member to bi-directional along an axis generally aligned with the plane of the seat back and limits the extent of the anchor member movement. The harness belts 80 are routed from beneath the interior space 32 of the seat and extend along the backrest portion to a pair of guides 76 disposed on the anchor member 74. The harness belts 80 are wrapped around the guides 76 and turned 180 degrees and directed back down along the seat back, but forward of the initial upward run, before being routed through openings in the headrest into the interior space 32 of the seat. This arrangement applies a downward force on the anchor member that generally maintains the member at the lowest (most downward) position permitted.

Figure 27:
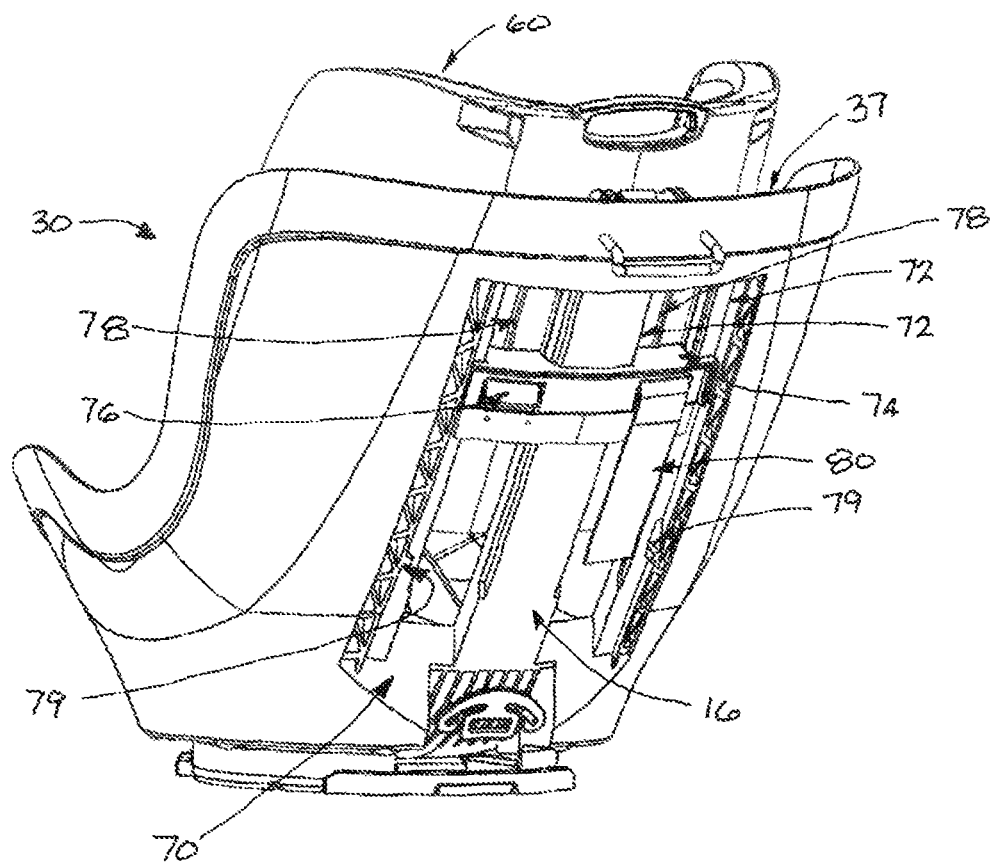
FIGS. 27 and 28 are a partial view of the adjustable headrest in the seat shell and illustrate the features for managing slack length of the occupant harness belts.

Upward-downward movement of the anchor member 74 is synchronized with upward downward movement of the headrest 60. The anchor member 74 includes one or more followers engaging elongate slots 78 on the headrest 60. The slots 78 are aligned generally with the axis of headrest movement. As the headrest 60 moves upwardly (FIG. 27), the followers contact the lowest extent of the slots 78 establishing a minimum belt take-up distance between the guides 76 and the headrest openings for the belt entrance into the shell interior space. Further upward movement of the headrest 60 moves the anchor member 74 upwardly thereby shifting the vertical position of the guides 76 to manage available slack in the harness belts 80 while maintain spacing between guides 76 and the headrest openings for the belt entrance into the shell interior space.

Figure 28:
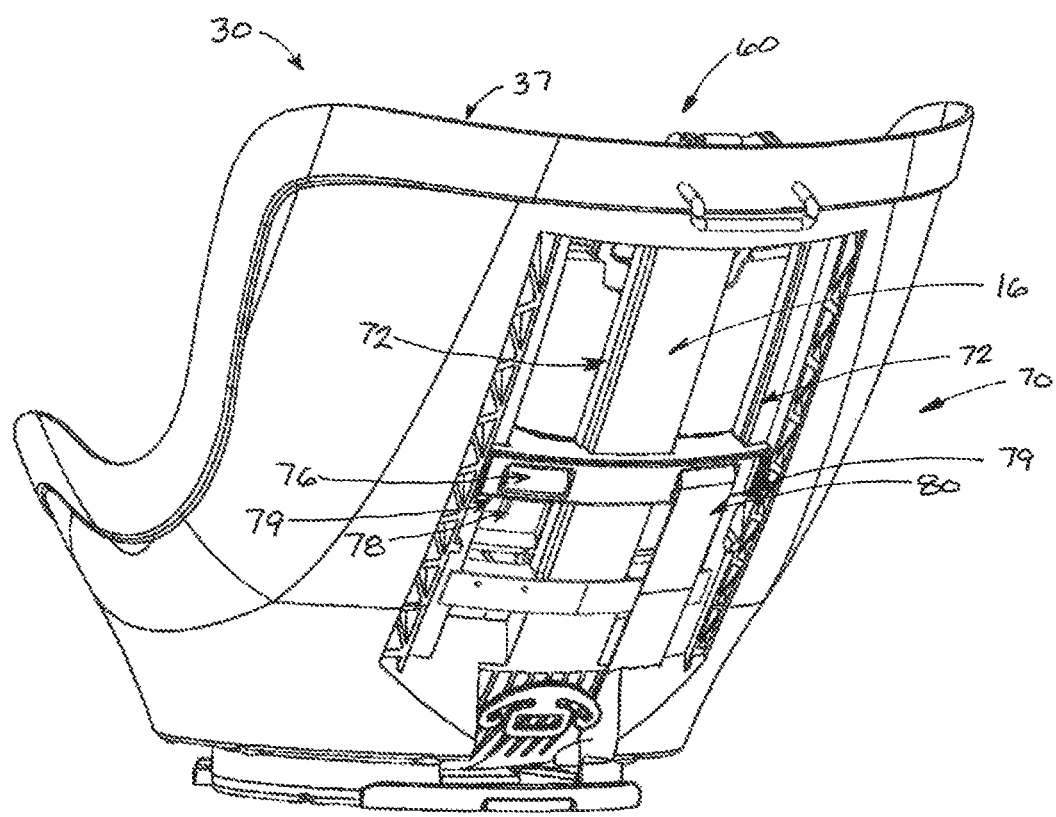
Figure 29:
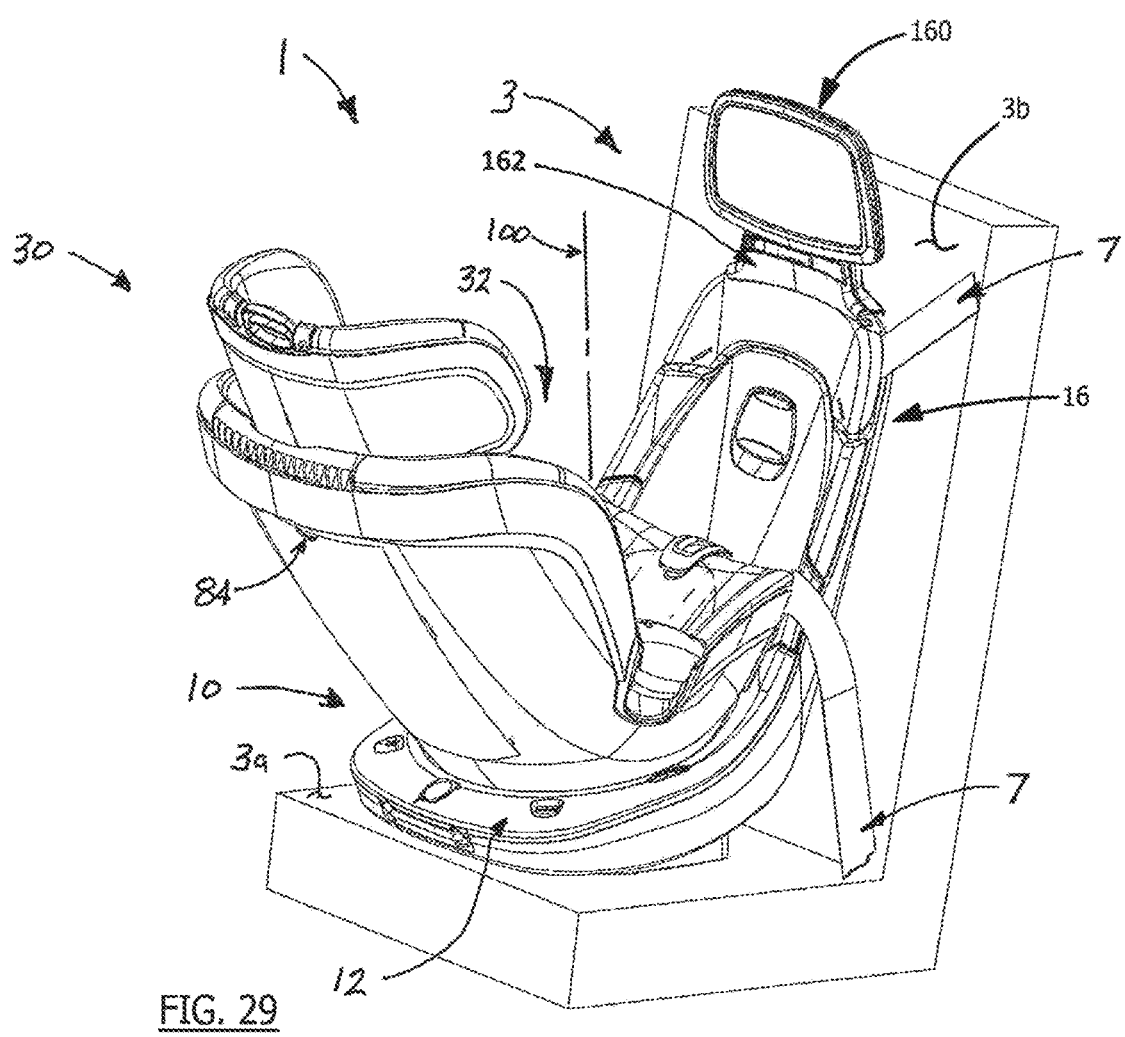
FIG. 29 is a perspective view of an accessory mount connectible to the base assembly when the seat is used in the rear-facing orientation.
Figure 30:
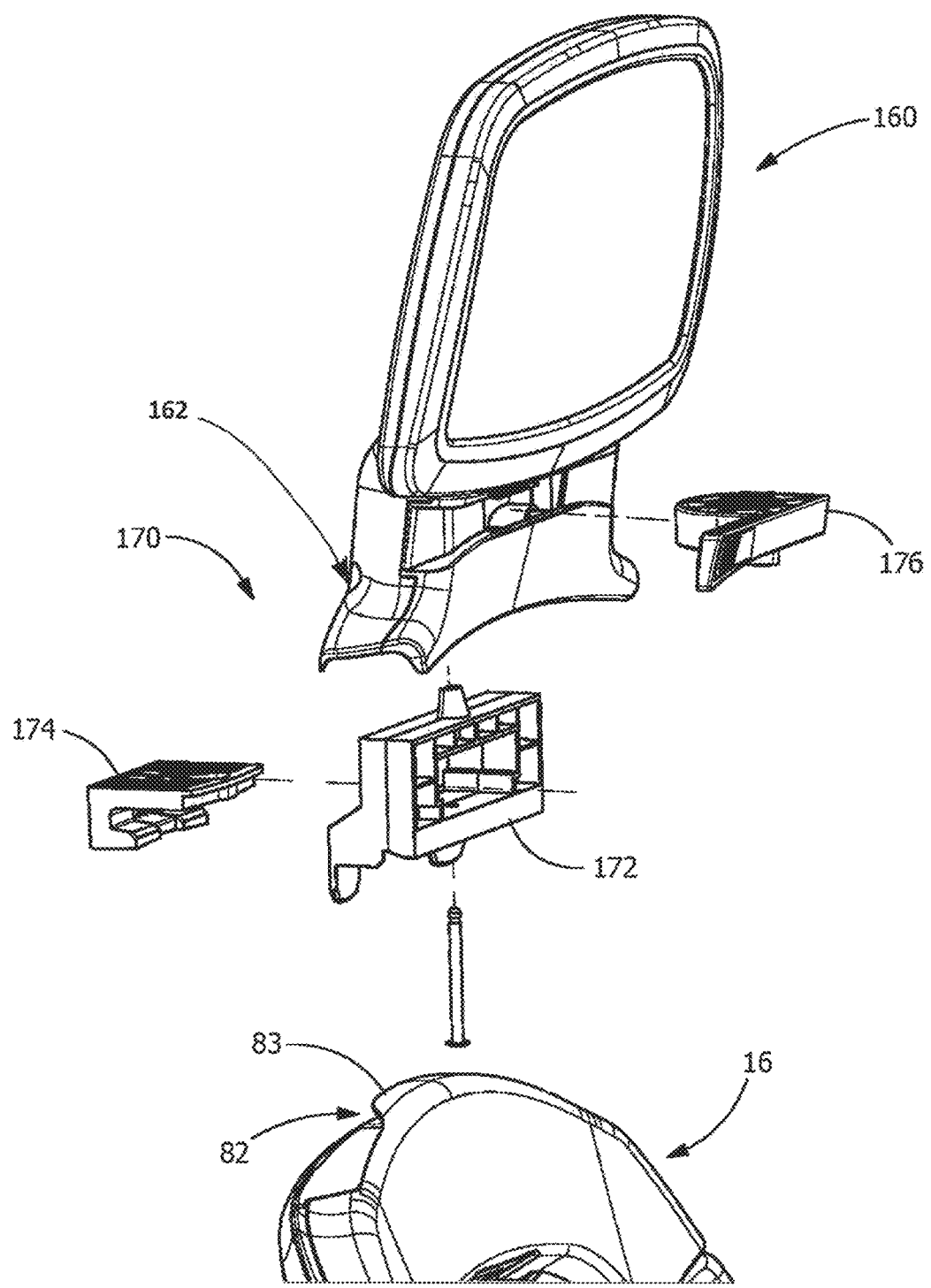
FIG. 30 is an exploded partial elevation view illustrating the accessory mount, latching mechanism, and the base assembly seatback.
Figure 31:
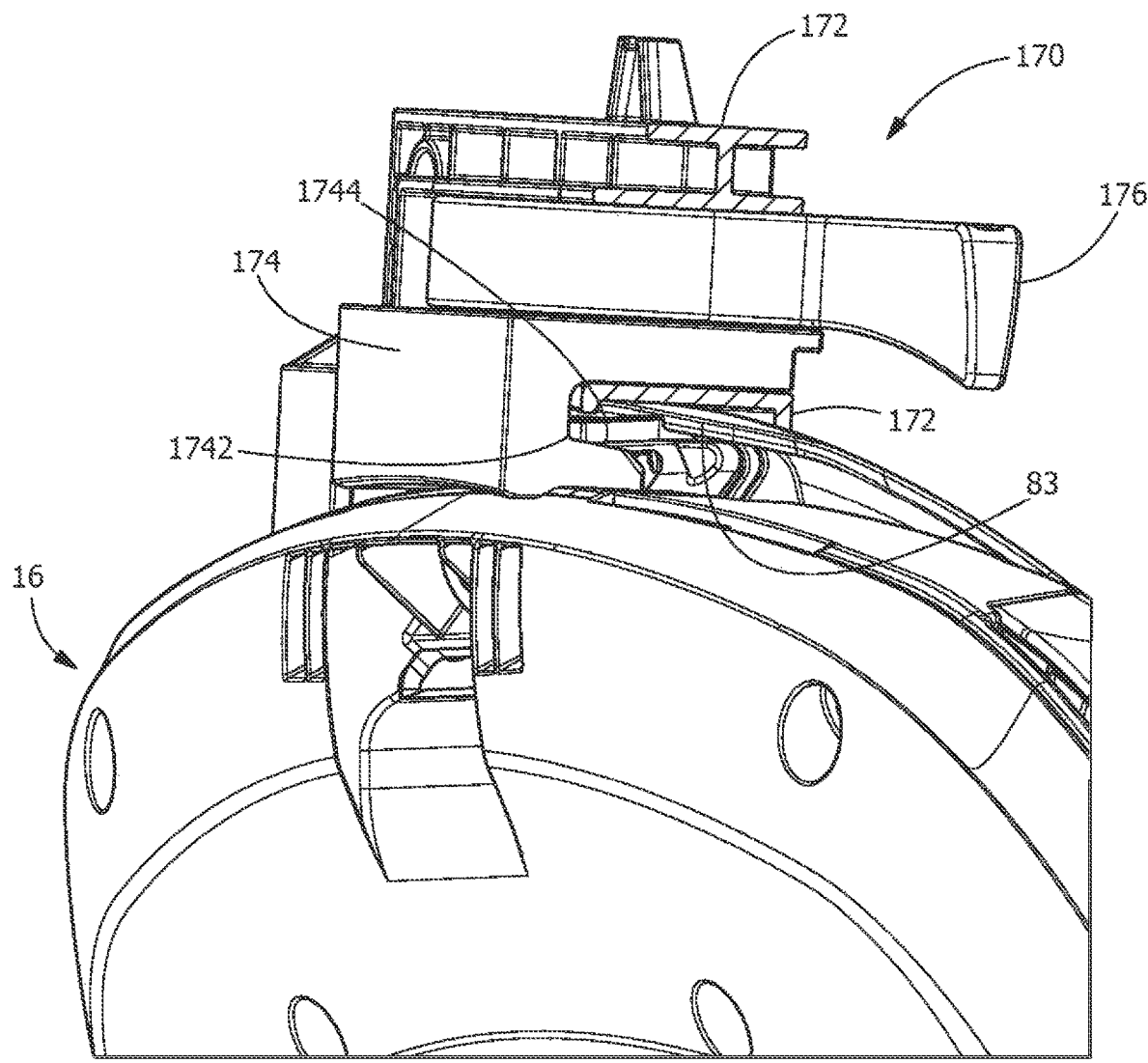
FIG. 31 is a partial view of the accessory mount showing the latching mechanism in the latched configuration.
Figure 32:
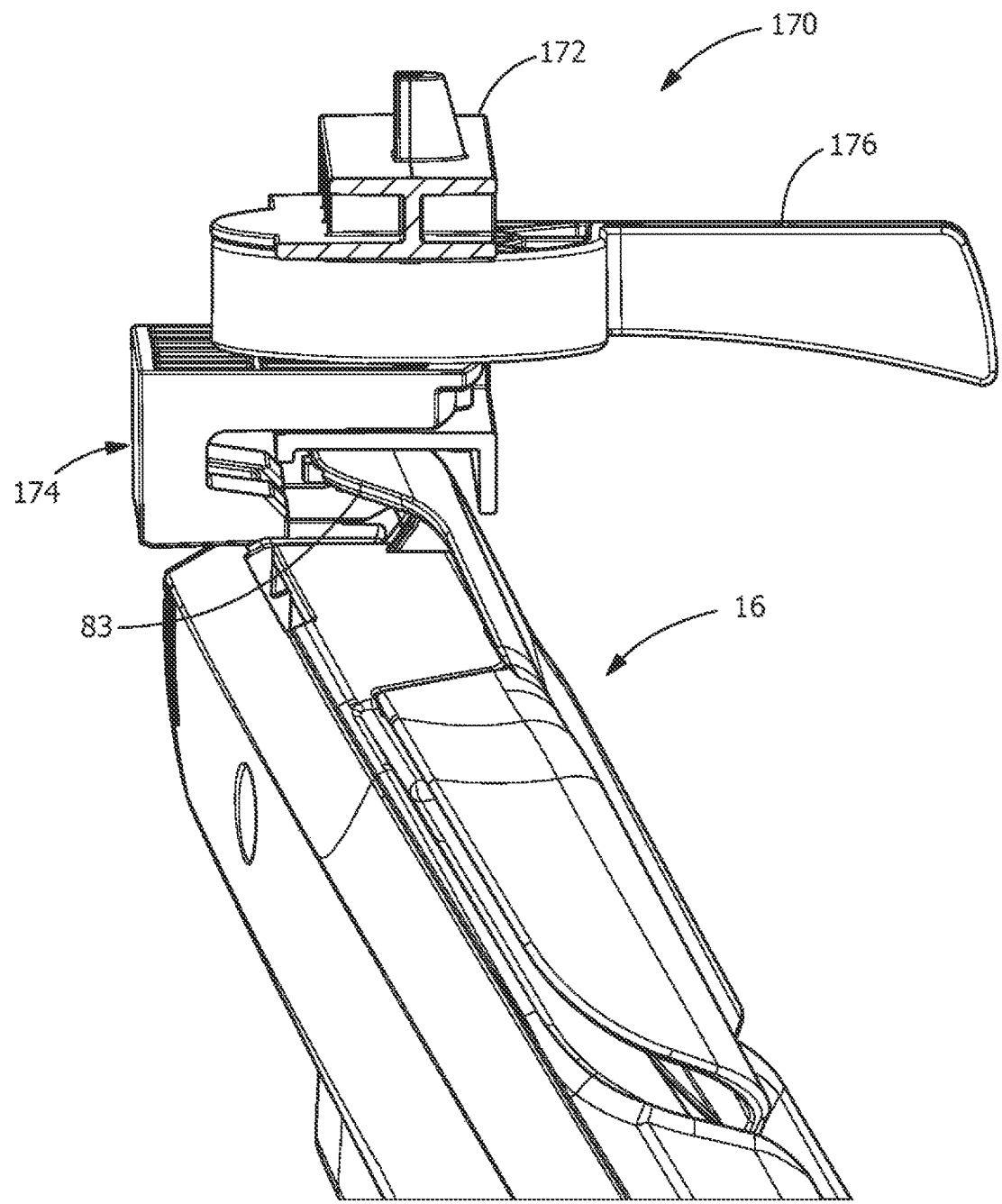
FIG. 32 is a partial view of the accessory mount showing the latching mechanism in the unlatched configuration.
Figure 33:
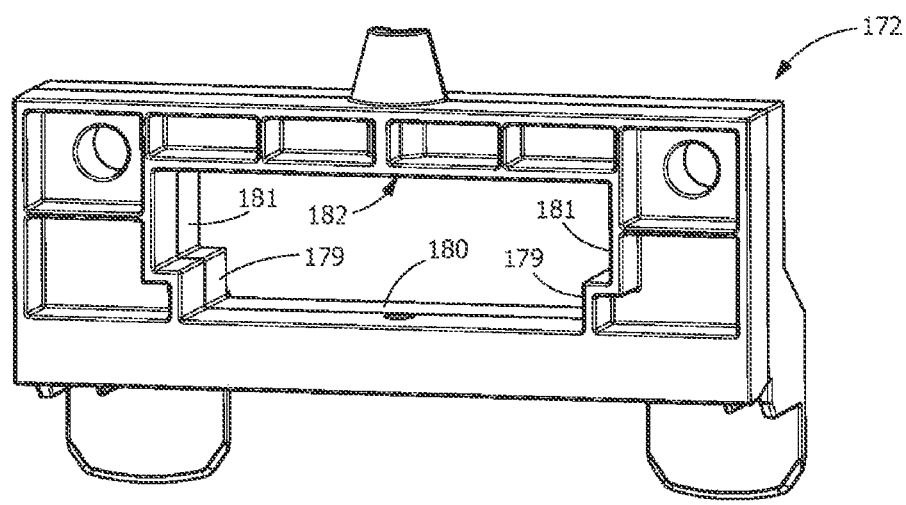
FIG. 33 is a partial view of the latching mechanism frame structure.

As the headrest is moved downwardly (FIG. 28), the anchor member 74 contacts a stop structure 79 positioned in the guide track 72. The stop structure 79 limits the rage of downward movement of the anchor structure 74. As the headrest 60 continues downward movement, the anchor member 74 remains stationary, shifting the followers upward in the slots 78. The slots 78 are configured to allow the headrest 60 to continue moving toward its lowest position after them the anchor member has contacted stop structure 79. This downward movement of the headrest in relation to the anchor member 74 increases the spacing between the guides 76 and the headrest openings for the belt entrance into the shell interior space. This increased spacing thus increases the length of the harness belts 80 within the seat shell structure to manage the slack in the seat shell itself. The benefit is that the harness belt length may be made long enough for convenience when the seat is used by larger occupants while taking in excess slack when the seat is adjusted for use with smaller occupants.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention;

Having thus described the invention, what is claimed is:

1. An accessory mount for use with a child safety seat, the seat having a base structure configured to be securable to a seat in a vehicle and having an upwardly extending backrest portion, the backrest portion including an upper end having a rearwardly opening receiver structure with an edge configured to be overlappingly engaged by a tongue disposed on a distal end of a seat shell attached to the base structure, the tongue engaging the receiving opening when the seat shell is rotatably positioned in a forward-facing orientation, the accessory mount comprising:
   an attachment base configured to matingly engage the upper end of the backrest portion when the seat shell is not in the forward-facing orientation;
   a locking member bi-directionally moveable between opposing locked and released positions; and
   a lever moveable between closed and open positions and operably connected to the locking member to effect movement between the locked and released positions, respectively, movement toward the locked position when the attachment base is engaged with the upper end to urge the locking member into a restraining engagement with the receiving opening edge and secure the accessory mount to the backrest portion.

2. The accessory mount of claim 1, wherein the attachment base engagement with the portion of the upper end prevents substantial movement of the attachment base in a fore-aft direction relative to the upper end.

3. The accessory mount of claim 2, wherein the attachment base further comprises a lock frame with a rotation guide and a guide structure, the lever rotatably connected to the lock frame and configured for rotation about the rotation guide, the guide structure guiding movement of the locking member in a bi-directional sliding motion relative to the guide structure.

4. The accessory mount of claim 3, wherein the locking member further includes a retainer having with an inclined surface engageable with the edge of the receiving structure as the locking member is moved toward the locked position while the accessory mount is matingly engaged with the upper end, continuing movement of the locking member toward the locked position increasing a clamping force between the accessory mount and the upper end as the inclined surface moves in contact with the edge.

5. The accessory mount of claim 3, wherein the lever further comprises a cam configured for synchronous rotation with the lever, and the locking member further comprises a follower profile positioned in adjacent contact with the cam, the cam and follower profile being contoured to cause sliding movement of the locking member responsive to rotation of the lever.

6. The accessory mount of claim 5, wherein the cam and follower profile are configured to vary a ratio of locking member linear movement to lever rotational movement as the lever is moved between open and closed positions.

7. The accessory mount of claim 6, wherein variation of the ratio of locking member linear movement to lever rotational movement reverses when the lever is closed to cause an over-center retention force of the lever in the closed position.

8. The accessory mount of claim 7, wherein the accessory is a mirror configured to provide enable viewing of a rear-facing occupant seat occupant from a forward vantage.

9. The accessory mount of claim 1, further comprising an accessory attached to the attachment base.

10. An accessory mount for a removeable base assembly for removably mounting a rear-facing child safety seat in a vehicle, the base assembly having an upstanding backrest with a receiving slot having a lower edge, the accessory mount comprising:
   an attachment base configured to engage an upper portion of the backrest and support an accessory; and
   a latching mechanism having a locking member bi-directionally moveable between opposing locked and released positions, the locking member engaging the lower edge of the receiving slot when moved toward the locked position to retain the accessory mount coupled to the backrest, and disengaging the lower edge of the receiving slot when moved to the released position allowing the accessory mount to be decoupled from the backrest.

11. The accessory mount of claim 10, further comprising a lever operably connected to the locking member to effect movement between the locked and released positions.

12. The accessory mount of claim 11, wherein the lever is rotatably coupled to the latching mechanism for rotation between open and closed positions corresponding to locked and released positions of the locking member, respectively, the lever further including a cam attached for rotation therewith, the cam engaging a driving profile on the locking member to move the locking member responsive to rotation of the lever.

13. The accessory mount of claim 12, wherein the cam radially engages the driving profile in a manner increasing mechanical advantage as the lever is moved toward the closed position.

14. The accessory mount of claim 13, wherein the driving profile includes an over center profile zone engaged by the cam when the lever is in the closed position configured to bias the lever in the closed position.

15. The accessory mount of claim 10, wherein the accessory is a mirror configured to provide enable viewing of a rear-facing occupant seat occupant from a forward vantage.

16. The accessory mount of claim 10, wherein the locking member includes an inclined surface, engagement of the inclined surface with the lower edge of the receiving opening urging the accessory mount toward the backrest as the latching mechanism is moved toward the locked position.

* * * * *